United States Patent [19]

Saitoh et al.

[11] Patent Number: 4,763,142
[45] Date of Patent: Aug. 9, 1988

[54] ELECTROPHOTOGRAPHIC PRINTER WITH LIGHT MICRO-SHUTTERS

[75] Inventors: Kouhei Saitoh; Hisashi Aoki; Kenzo Endo; Atsushi Mawatari, all of Tokyo, Japan

[73] Assignee: Casio Computer Co., Ltd., Tokyo, Japan

[21] Appl. No.: 903,592

[22] Filed: Sep. 3, 1986

[30] Foreign Application Priority Data

Sep. 10, 1985 [JP] Japan ................................ 60-200041
Sep. 10, 1985 [JP] Japan ................................ 60-200042
Sep. 10, 1985 [JP] Japan ................................ 60-200045

[51] Int. Cl.⁴ ...................... G01D 15/14; G03G 15/04
[52] U.S. Cl. ..................................... 346/160; 355/3 R
[58] Field of Search ................... 355/1, 3 R, 7, 14 E, 355/71; 354/5, 6, 13; 346/107 R, 160; 340/765, 784; 358/300, 302; 350/330, 331 R, 332–334, 336

[56] References Cited

U.S. PATENT DOCUMENTS

| 3,049,968 | 8/1962 | Johanson | 355/11 |
| 3,936,172 | 2/1976 | McVeigh | 355/4 X |
| 3,967,894 | 7/1976 | Tsilibes | 355/4 |
| 4,297,022 | 10/1981 | Lester . | |
| 4,386,836 | 6/1983 | Aoki et al. . | |

FOREIGN PATENT DOCUMENTS

| 3213872 | 11/1982 | Fed. Rep. of Germany . | |
| 3426845 | 2/1985 | Fed. Rep. of Germany . | |
| 59-168468 | 9/1984 | Japan | 355/14 E |
| 1529916 | 10/1978 | United Kingdom . | |
| 2067814 | 7/1981 | United Kingdom . | |

Primary Examiner—Arthur T. Grimley
Assistant Examiner—J. Pendegrass
Attorney, Agent, or Firm—Frishauf, Holtz, Goodman & Woodward

[57] ABSTRACT

An image forming apparatus has a light source, and one or more liquid crystal units for forming a latent image on the photosensitive drum by controlling the passage of the light from the light source between the light source and the drum. The liquid crystal units have a plurality of shutter arrays arranged with a plurality of microshutters. The microshutter has a miniature region for controlling the passage of the light, and the regions are different at every microshutter for forming the individual shutter arrays.

25 Claims, 13 Drawing Sheets

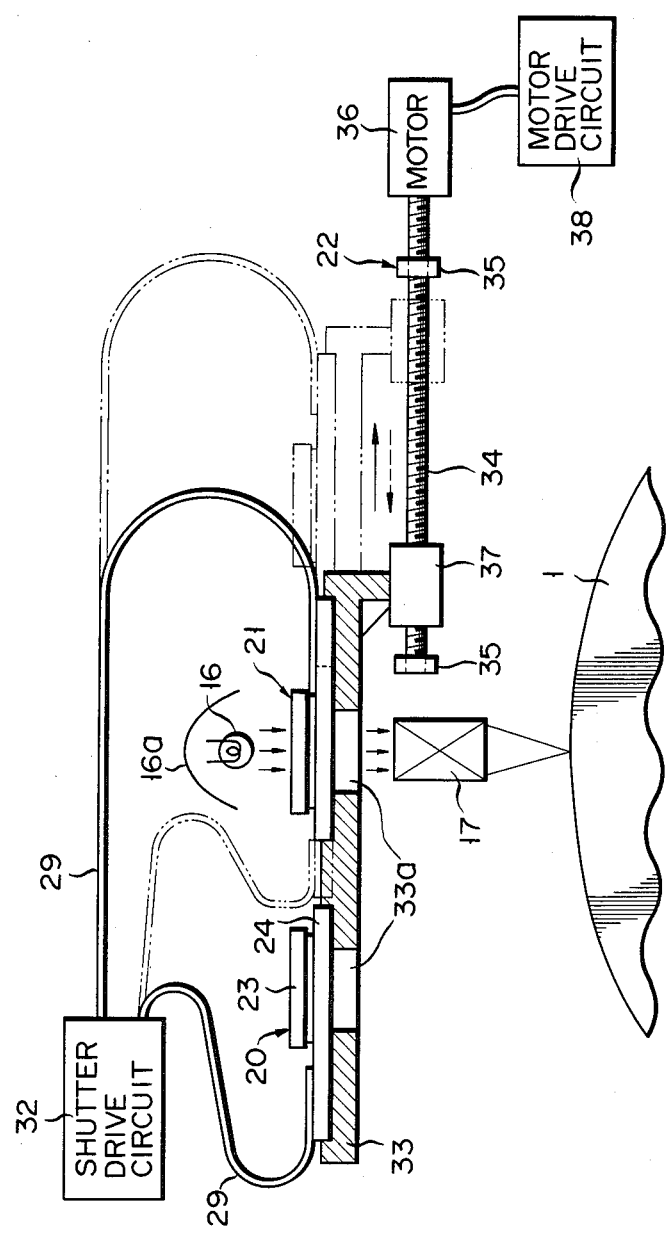

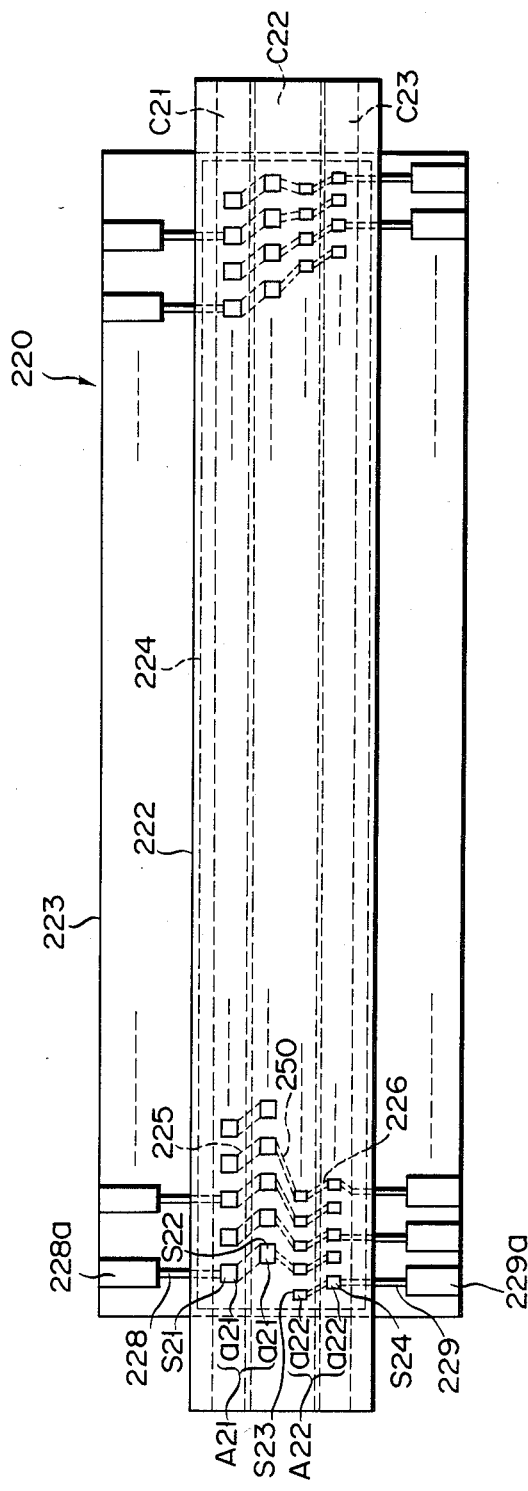

ELECTROPHOTOGRAPHIC PRINTER WITH LIGHT MICRO-SHUTTERS

BACKGROUND OF THE INVENTION

The present invention relates to an improvement in an image forming apparatus for forming a character or a figure with microminiature dots and, more particularly, to an image forming apparatus for forming an image on a photosensitive unit by at least two shutter arrays having different number of dots (dot density) formed per unit length to form microminiature dots to transfer the image on a recording medium.

Recently, a liquid crystal unit is used for an office automation equipment such as a display unit or an electrophotographic printer of a terminal unit for a computer. The liquid crystal unit used for the electrophotographic printer has in general the following structure. A pair of substrates are opposed through a liquid crystal substance. A plurality of signal electrodes are provided on the inner surface of one of the substrates. A plurality of common electrodes are formed on the inner surface of the other of the substrates. Thus, a plurality of microshutters for turning ON and OFF a light are provided. The microshutter is composed of a part of the portion that the signal electrode and the common electrodes are opposed, and a liquid crystal interposed between the electrodes. The liquid crystal substance is sealed by a sealing member. The sealing member is formed along the outer shells of the pair of substrates. A plurality of microshutters are arranged to form a shutter array.

The liquid crystal unit of the above-mentioned construction is sometimes used as a photowriting in an electrophotographic printer. In this case, a liquid crystal unit is interposed between a light source and a photosensitive unit in the printer, and a liquid crystal drive circuit applies a signal to the signal electrodes and common electrodes of the liquid crystal unit. The microshutter for forming the shutter array of the liquid crystal unit is selectively driven by the signal to "open" (passing the light) or "close" (interrupting the light) to control the transmission of the light from the light source. Thus, a microminiature dotted image is focused on the photosensitive unit. A plurality of the dotted images are combined to form an electrostatic latent image representing a character image on the photosensitive unit. The latent image formed on the photosensitive unit is converted to a visible image, which is transferred to a sheet and printed.

Of a conventional electrophotographic printer using such a liquid crystal unit, the case using a liquid crystal of twisted nematic mode (TN mode) for the liquid crystal unit is disclosed, for example, in U.S. Pat. No. 4,386,836. This liquid crystal unit has the following construction. A nematic liquid crystal is sealed between a pair of opposed substrates. The liquid crystal molecules of the liquid crystal are twisted and oriented until the molecules arrive from one substrate at the other. A pair of polarizing plates in which the polarizing axes are perpendicularly crossed to one another are disposed outside the pair of substrates. A microshutter formed at part of the portion that a plurality of signal electrodes and a plurality of common electrodes are respectively opposed is formed in an equal size of a region for controlling the passage of the light. The microshutters are arranged in one or more rows to form a shutter array. The liquid crystal unit is driven by two frequency addressing scheme to accelerate the responding velocity.

In other words, when the voltage of low frequency $f_L$ is applied to the signal electrodes and the common electrodes, liquid crystal molecules cross at their long axes to the electrode surface. Thus, the microshutter interrupts the light to become OFF. When the voltage of high frequency $f_H$ is applied between the electrodes, the molecular long axes of the liquid crystal are parallel to the electrode surface, twisted and oriented. Thus, the microshuter passes the light to become ON.

The case that a liquid crystal unit of Guest-Host effect mode is used for an electrophotographic printer is disclosed in U.S. Ser. No. 630,957 filed by the same assignee as the present invention. In other words, this liquid crystal unit has the following construction. A nematic liquid crystal added with dichromatic dye is sealed between a pair of opposed substrates. The liquid crystal molecules of the liquid crystal are homogeneously oriented. At least one polarizing plate is disposed outside the pair of substrates. A microshutter formed at a part of the portion that a plurality of signal electrodes and a plurality of common electrodes are opposed is formed in equal size in regions for controlling the passage of the light. The microshutters are arranged in one or more rows to form one shutter array. This liquid crystal unit is driven by two frequency addressing scheme so as to accelerate the responding velocity. In this case, when the voltage of low frequency $f_L$ is applied between the signal electrodes and the common electrodes, the molecule axes of the liquid crystal cross perpendicularly to the electrodes. The molecule axes of dichromatic dye which behave together with the liquid crystal molecules also cross perpendicularly to the electrodes. Therefore, the dye does not absorb the light, and the microshutter passes the light to become ON. When the voltage of high frequency $f_H$ is applied between the electrodes, the molecule axes of the liquid crystal become parallel to the electrode surface. Thus, the molecule axes of the dye become parallel to the electrode surface. Then, the dye absorbs the light of the specific wavelength band for the dye. Therefore, the microshutter interrupts the light of the specific wavelength band to become OFF.

The above-mentioned conventional liquid crystal unit has a sole shutter array formed by arranging the microshutters having equal size of regions (openings) for controlling the light in a predetermined number (arraying density) per unit length. Thus, the conventional electrophotographic printer using the liquid crystal forms an image having a dot density corresponding to the arraying density of the shutters in one type of shutter array provided in the liquid crystal unit and dot density of 1/ integer number of the corresponding dot density, and merely prints the image.

The arraying density of dots for forming a character or a figure in general employs 240 dots per inch (DPI), 300 dots per inch (DPI) or 480 dots per inch (DPI). The dot arraying density is determined in response to the sort or the size (the number of points) of a type unit of the case for printing a character. For example, kanji in Japan is frequently printed in the arraying density of 240 DPI. and alphabetic character frequently printed in the U.S.A. or Europe in the arraying density of 300 DPI or 480 DPI.

However, the conventional electrophotographic printer having a liquid crystal unit has a sole shutter in which the magnitude of a region for controlling the light passing state is equal in its liquid crystal unit and a plurality of microshutters of equal arraying density per inch are arranged.

Therefore, the above-mentioned conventional electrophotographic printer cannot print by using type units of arbitrary sort, nor print with type units of arbitrary size. Further, the electrophotographic printer using the conventional liquid crystal unit cannot be used except the case of receiving an image signal according to the specific dot arraying density specified by the arraying density of the microshutters, and is limited in utility. If the electrophotographic printer is used for the utility of receiving an image signal according to different dot arraying density, it requires an expensive converter for converting the image signal into a signal according to the specific dot density of the printer.

SUMMARY OF THE INVENTION

An object of the present invention is to provide an image forming apparatus which can eliminate the drawbacks and disadvantages of the conventional electrophotographic printer using a liquid crystal unit and permits printing any image irrespective of the sort and the size of a type unit to be printed and, thus, also permits forming an image such as a figure and/or character even when receiving image signals of several sorts according to the arraying density of different dots.

In order to achieve the above object, there is provided according to the present invention an image forming apparatus comprising at least one light source; photosensitive means for discharging charge stored in advance on the surface thereof by photosensing a light from the light source; a plurality of light control means for forming a plurality of microminiature regions for controlling the quantity of light emitted to the photosensitive means, the regions having different sizes to form a latent image on the photosensitive means by controlling the light emitted from the light source to the photosensitive means; and means for fixing the latent image formed on the photosensitive means as a visible image on a recording medium.

With the constitution described above, the image forming apparatus of the present invention has a plurality of light control means having different sizes of microminiature regions for controlling the light transmitting quantity. Therefore, a latent image can be formed on the photosensitive means with dots of different arraying density per unit length.

Therefore, the image forming apparatus of the present invention can print a character of arbitrary format with a type unit of an arbitrary size. The image forming apparatus of the present invention can print a figure and/or a character even when receiving an image signal according to an image of different arraying density of dots.

BRIEF DESCRIPTION OF THE DRAWINGS

FIG. 2 is a schematic view of the construction of a light recorder of the first embodiment of the invention;

FIG. 9 is a plan view showing the construction of a modified example of the liquid crystal unit shown in FIG. 5;

DETAILED DESCRIPTION OF THE PREFERRED EMBODIMENTS

Figure 1:
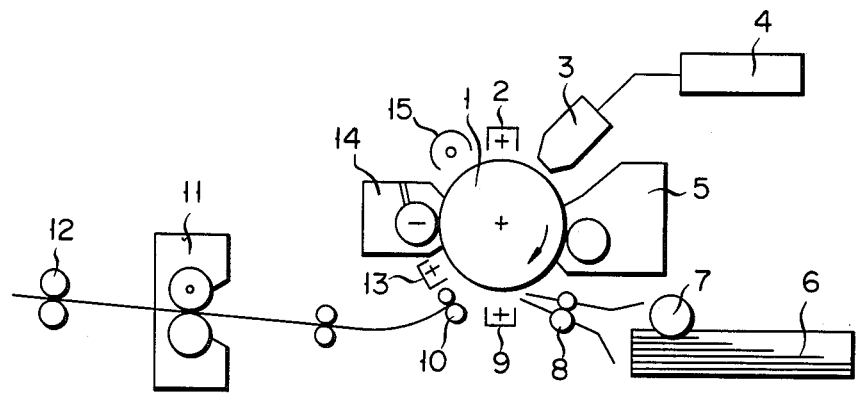
FIG. 1 a schematic view of the construction of the entire image forming apparatus according to an embodiment of the present invention.

The first embodiment of the present invention will be described with reference to FIGS. 1 to 4. The construction of an electrophotographic printer will be first described in detail with reference to FIG. 1. Charger 2 is provided near photoconductive photosensitive drum 1 to uniformly charge the surface of drum 1. Light recorder 3 photowrites on the surface of charged drum 1. Record controller 4 controls the operation of recorder 3 according to record information such as an image supplied from externally. Recorder 3 emits light dots on the surface of drum 1. The charge of the portion where the light is emitted on the surface of drum is erased. Thus, an electrostatic latent image is recorded with dots on the surface of drum 1. The latent image is developed by developing unit 5, and a toner image is formed.

A recording sheet 6 is supplied by roll 7. Supplied sheet 6 is temporarily stopped by standby roll 8. Sheet 6 is fed to transfer unit 9 synchronously with the toner image on the surface of drum 1. The toner image is transferred to sheet 6 in transfer unit 9. Sheet 6 is separated from drum 1 in separator 10. Further, sheet 6 is fixed with a toner image in a fixing unit 11, and fed by rollers 12. After the toner image is transferred to sheet 6, the toner on drum 1 is electrically neutralized by static eliminator 13. Then, the remaining toner is cleaned by cleaner 14. Further, the surface of drum 1 is electrically neutralized by eraser 15.

Recorder 3 has, as shown in FIG. 2, light source 16, two sets of photowriting liquid crystal units 20, 21 provided between light source 16 and drum 1, shutter position setter 22 for setting the positions of units 20, 21 and focusing lens 17. A light from source 16 is controlled by units 20, 21 to be emitted to the surface of drum 1 through lens 17 by controlling the light from source 16 through units 20, 21. Source 16, units 20, 21, Setter 22 and lens 17 construct a set of electrophotographic unit. Numeral 16a designates a reflector attached to source 16.

Figure 3A:
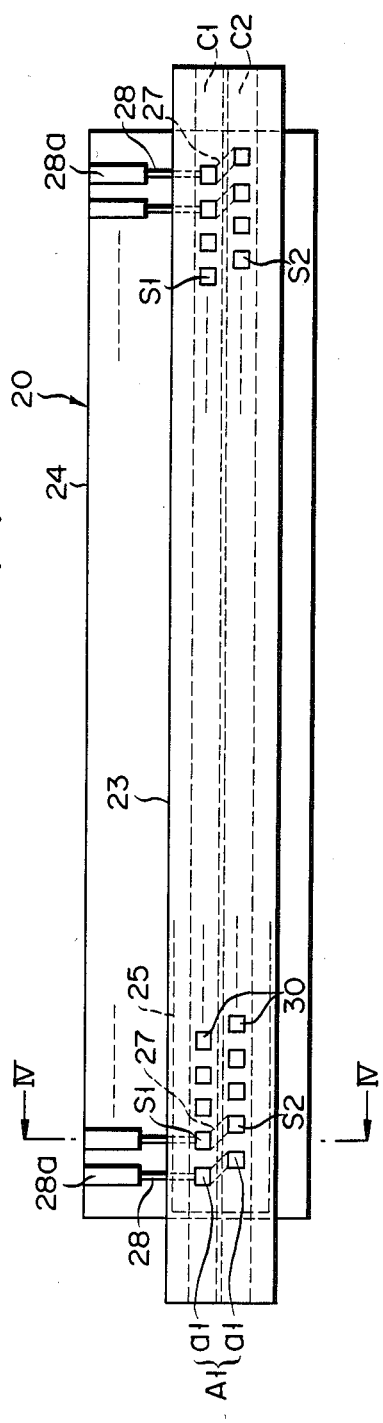
FIGS. 3(a) and 3(b) are plan views showing the construction of the liquid crystal unit shown in FIG. 2.
Figure 3B:
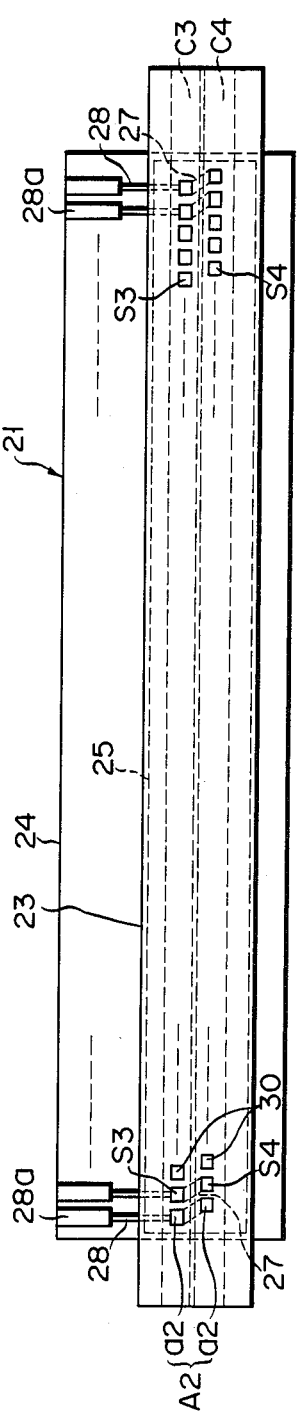

Liquid crystal units 20, 21 will be described. Units 20, 21 are formed in the lateral long shape along the axial direction of drum 1 and respectively provided with sets of shutter arrays in which a plurality of miniature microshutters for controlling the passage of the light are provided along the longitudinal direction. The shutter arrays provided in units 20, 21 have different sizes of microshutters and different number of arrays per unit length, i.e., different arraying density. For example, shutter array $A_1$ of unit 20 has, as shown in FIGS. 3(a) and 3(b), microshutters $a_1$ arranged in the density of 240 dots per inch. Shutter array $A_2$ of unit 21 has microshutters $a_2$ arranged in the density of 300 dots per inch.

Figure 4:
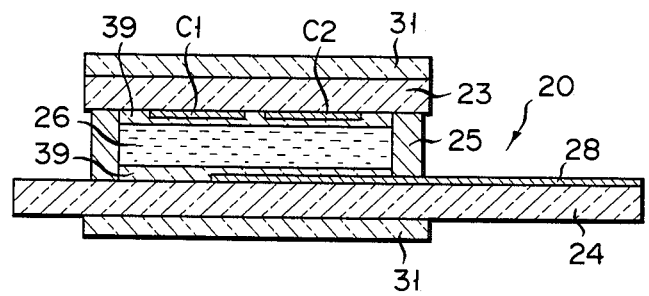
FIG. 4 is a sectional view taken along the line IV—IV of the crystal unit shown in FIG. 3(a)

Units 20 and 21 have fundamentally the same construction, which will be described with unit 20 as an example with reference to FIGS. 3(a) and 4. In FIGS. 3(a) and 4, numerals 23 and 24 designate a pair of upper and lower substrates and both of substrates made of transparent glass plates. Substrates 23, 24 are bonded by a sealing material 25 of lateral long frame shape. Liquid crystal 26 for guest-host effect type is, for example, filled in a space between substrates 23 and 24 surrounded by material 25.

Two common electrodes $C_1$, $C_2$ of strip shape are formed in parallel at a miniature interval over the entire length on the inner surface of substrate 23. A number of segment electrodes $S_1$, $S_1$, ..., $S_2$, $S_2$, ... of square shape are opposed in two rows to common electrodes $C_1$ and $C_2$ of substrate 23 in a predetermined density (240 dots/inch) over the longitudinal direction on the inner surface of substrate 24. Electrodes $C_1$, $C_2$ and $S_1$, $S_1$, ..., $S_2$, $S_2$, ... are formed of transparent electrode materials. A plurality of microshutters $a_1$, $a_1$, ... are arranged in two rows in the longitudinal direction of the substrate on the opposed portions. Microshutters $a_1$, $a_1$, ... are arranged in the density of 240 dots per inch. Shutter array $A_1$ is formed of a plurality of rows of microshutters $a_1$, $a_1$, .... Electrodes $S_1$, $S_1$, ..., and $S_2$, $S_2$, ... are arranged by displacing the electrodes longitudinally of the substrates. Accordingly, shutters $a_1$, $a_1$ are arranged in a zigzag manner longitudinally of the substrate. This zigzag arrangement of microshutters $a_1$, $a_1$ is formed to form an electrostatic latent image of high dot density on the surface of the photosensitive drum by emitting the light passing microshutters $a_1$, $a_1$, ... of the other row between the rows of emitting points on the surface of the photosensitive drum in which every other row is emitted by the light passing microshutters $a_1$, $a_1$, ... of one row.

Electrodes $S_1$, $S_1$, ... of one row and $S_2$, $S_2$, ... of the other row are connected between the adjacent electrodes by common connecting leads 27, 27, ... formed on the inner surface of substrate 24 by positional displacement. External connecting leads 28, 28, ... are respectively connected to electrodes $S_1$, $S_1$, ... of one row. Leads 28, 28, ... are respectively formed longitudinally of substrate 24 at one side edge of substrate 24. The ends of leads 28, 28, ... are respectively formed with wide terminals 28a, 28a, ... for connecting external connecting conductors 29. Leads 27, 27, ..., and 28, 28, ... are formed of transparent electrode materials. Electrodes $C_1$, $C_2$ are respectively connected at the ends to external connecting leads.

Low resistance metal films (not shown) for reducing electric resistance are coated on the surfaces of leads 27, 27, ..., and 28, 28, ... except terminals 28a, 28a, ... Low resistance metal films (not shown) are coated on the surfaces of electrodes $C_1$, $C_2$ except the portions of microshutters $a_1$, $a_1$, ... to be provided to reduce the electric resistance of the common electrodes and the signal electrodes and to form shutter windows (corresponding to transparent segment electrodes $S_1$, $S_1$) 30, 30 for restricting the light transmitting regions of microshutters $a_1$, $a_1$, ....

Liquid crystal aligning films 39, 39 are respectively formed on the inner surfaces of substrates 23 and 24. Polarizing plates 31, 31 are formed on the outer surface of substrate 23.

Further, liquid crystal unit 21 shown in FIG. 3(b) has different arraying density (i.e., the arraying density of electrodes $S_3$, $S_3$, ..., and $S_4$, $S_4$, ...) of microshutters $a_2$, $a_2$, ... in shutter array $A_2$ as compared with liquid crystal unit 20, and the other configuration is the same as that of unit 30 described as above. Therefore, the same portions as those in FIG. 3(a) tenote the same or corresponding numerals in FIG. 3(b). The electrode configuration of unit 21 is formed of common electrodes $C_3$, $C_4$ for common substrate 23. Substrate 24 has segment electrodes $S_3$, $S_3$, ..., and $S_4$, $S_4$, ... arranged in zigzag manner of two rows of microshutters of 300 dots per inch in size. Thus, a plurality of microshutters $a_2$, $a_2$ are arranged in a zigzag manner of two rows in the arraying density of 300 dots per inch on the portion that electrodes $C_3$, $C_3$, $S_3$, $S_3$, ..., and $S_4$, $S_4$, ... are opposed. Shutter array $A_2$ is formed of microshutters $a_2$, $a_2$, ....

Liquid crystal units 20, 21 thus constructed as described above have connecting conductors 29, 29 of flexibility connected, as shown in FIG. 1 to the ends of common electrodes (common electrodes $C_1$, $C_2$ of unit 20 and common electrodes $C_3$, $C_4$ of unit 21) and terminals 28a, 28a of leads 28, 28, ... Units 20, 21 are connected through conductors 29, 29 to shutter drive circuit 32. Unit 20 applies a voltage of a drive signal from drive circuit 32 through electrodes $C_1$, $C_2$, leads 28, 28, ... and leads 27, 27, ... to segment electrodes $S_1$, $S_2$, ..., and $S_2$, $S_2$, ... Thus, the behavior of the liquid crystals is controlled to selectively drive microshutters $a_1$, $a_2$, ... to "open" or "close". Unit 20 applies a voltage of a drive signal of drive circuit 32 through electrodes $C_3$, $C_4$, leads 28, 28, ..., and 27, 27, ... to electrodes $S_3$, $S_3$, ..., and $S_4$, $S_4$, .... Thus, microshutters $a_2$, $a_2$, ... are selectively driven to "open" or "close". The drive type of units 20, 21 is of time division drive with two frequencies. Drive circuit 32 is contained in controller 4.

Then, a shutter position setter 22 will be described in detail. In FIG. 2, numeral 33 designates a shutter holder, which holds liquid crystal units 20, 21 aligned in parallel along the axial direction of drrm 1. The holder 33 has openings 33a, 33a formed corresponding to shutter arrays $A_1$, $A_2$ of units 20, 21 at the bottom. Holder 33 is supported by a guide rail, not shown, and provided to linearly move in a direction perpendicular to the axial direction of drum 1. Units 20, 21 are selectively disposed with respect to light source 16 by the movement of holder 33. In other words, when holder 33 is moved in a direction of a solid line with an arrow in FIG. 2, unit 20 is opposed to light source 16. When holder 33 is moved in a direction of a broken line with an arrow in FIG. 2, unit 21 is opposed to light source 16. In FIG. 2, numeral 34 designates a feeding screw for moving holder 33, which screw is rotatably supported to bearings 35, 35 and rotated by a motor 36. A nut 37 fixed to holder 33 is engaged with screw 34. Since nut 37 is fixed to holder 33, nut 37 linearly moves axially of screw 34 by the rotation of screw 34. In other words, holder 33 can be moved together with nut 37 by the rotation of screw 34. If a number of small balls are associated in nut 37 in a ball screw structure, nut 37 can be efficiently moved by the rotation of screw 34. Motor 36 is controlled in the rotary drive by motor drive circuit 38, which is contained in controller 4.

The operation of recorder 3 in an electrophotographic printer constructed as described above will be described. In recorder 3, setter 22 selectively moves units 20, 21 to the position corresponding to light source 16 according to image information. An image of predetermined dot arraying density is formed on drum 1 by selected units 20, 21. When unit 20 is altered to available state from the state designated by solid lines in FIG. 2, motor 36 is driven by a signal from drive circuit 38 to rotate screw 34. Then, holder 33 is moved in a direction of a solid line with an arrow in FIG. 2 through nut 37 by the rotation of screw 34. Thus, unit 20 is set to the position corresponding to light source 16. A signal based on image information from drive circuit 32 is fed to unit 30 to control microshutters $a_1$, $a_1$, ... in shutter array $A_1$ of unit 30 to "open" or "close". Thus, the light from light source 16 is controlled to pass through microshutters $a_1$, $a_1$, ... of shutter array $A_1$. Further, the light passing the microshutters is emitted through lens 17 to the surface of drum 1. An image (electrostatic latent image) is formed on the surface of drum 1 by the light. The dot density of the image is determined according to the arraying density (240 dots/inch) of microshutters $a_1$, $a_1$, ... of unit 20 to 240 dots/inch. With the liquid crystal unit, the image can be formed in the density of 240 dots/inch × 1/integer number, i.e., 120, 80, 60, 48, ... dots/inch. The image of 240 dots/inch is in general used for the case of printing a kanji in a printer. Then, when using other liquid crystal unit 21, motor 36 is rotated in reverse direction to the case that motor 36 is driven by screw 34 by a signal from drive circuit 38. Holder 33 is moved in a direction of a broken line with an arrow in FIG. 2 by the rotation of screw 34. Thus, unit 21 is set to the position corresponding to light source 16. Then, a signal based on image information from drive circuit 32 is fed to unit 21 to control microshutters $a_2$, $a_2$, ... of shutter array $A_2$ of unit 21 to "open" or "close". Thus, the light from the light source is controlled to pass the microshutters $a_2$, $a_2$, ... of shutter array $A_2$. Further, the light is emitted through lens 17 to the surface of drum 1. An image (electrostatic latent image) is formed on the surface of drum 1 by the light. The dot density of the image is determined according to the arraying density (300 dots/inch) of microshutters $a_2$, $a_2$, ... of unit 21 to 300 dots/inch. When using the liquid crystal unit, an image can be formed in the density of 1/integer number of 300 dots/inch, i.e., 150, 100, 75, 50, ... dots/inch. The image of 300 dots/inch is used in general for printing alphabetic character in a printer.

Thus, when the combination of liquid crystal units 20, 21 is used, the image can be formed entirely in the dot density of wide range combined with 240 dots/inch and 300 dots/inch, i.e., the image of 300, 240, 150, 120, 100, 80, 75, 60, 50, 48, ... dots/inch can be formed to be printed.

Therefore, the electrophotographic printer of the present invention has both the function of printing by the image information of 240 dots/inch of dot density and the function of printing by the image information of 300 dots/inch, and can print according to both the image information.

Further, recorder 3 has two liquid crystal units 20, 21 as a sole light recording unit, and shutter position setter 22 to form images of a plurality of types of different dot densities. Therefore, the mounting construction of the electrophotographic printer is simplified as compared with the construction provided with two sets of light recorders respectively having liquid crystal units.

In the embodiment described above, two liquid crystal units have been used for the electrophotographic printer. However, the present invention is not limited to the particular embodiment. For example, three or more liquid crystal units may be employed.

In the embodiment described above, the liquid crystal light shutters have been linearly moved as the shutter position setter for setting a plurality of liquid crystal units to the positions corresponding to the light source. However, the image forming apparatus of the present invention is not limited to the particular embodiment. For example, other type such as the type that liquid crystal units are moved along the circumferential direction of the photosensitive drum may be employed.

The present invention is not limited to the electrophotographic printer of the type designated by the embodiment described above. For example, the present invention can be applied to other type printer such as one type that a photosensitive unit is formed in a flat plate shape, and can be hence applied widely to the image forming apparatus using a liquid crystal light shutter.

Figure 5:
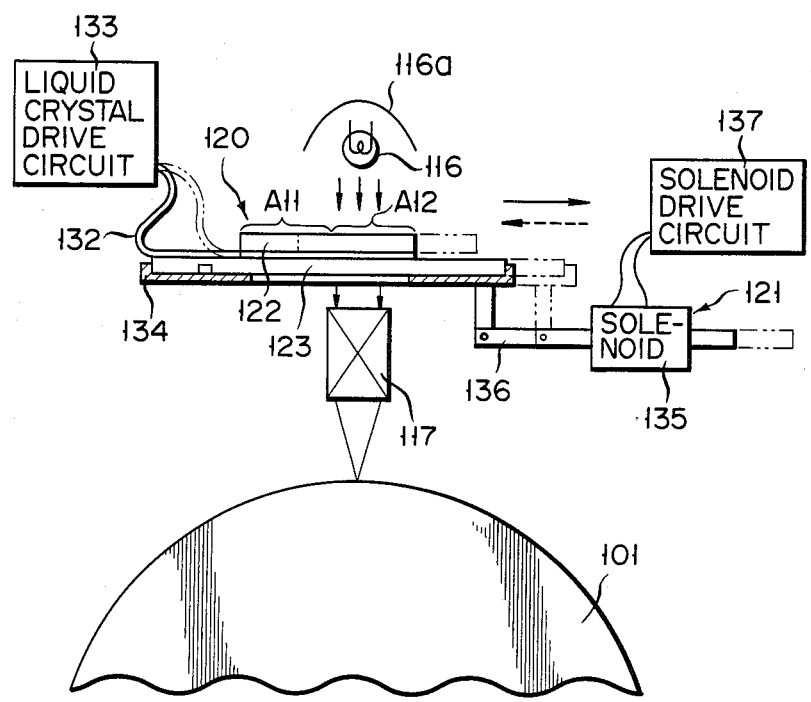
FIG. 5 is a schematic view of the construction of a light recorder according to second embodiment of the present invention.

Second embodiment of the present invention will be described in detail with reference to FIGS. 5 to 14. Light recorder 3 shown in FIG. 1 has, as shown in FIG. 5, light source 116, liquid crystal unit 120 provided between source 116 and photosensitive drum 101, shutter position setter 121, and focusing lens 117. The light from source 116 is emitted through unit 120 and lens 117 to the surface of drum 101. Numeral 116a designates a reflecting mirror attached to light source 116.

Liquid crystal unit 120 of this second embodiment will be described. Unit 120 is formed in a lateral long shape along axial direction of drum 101. Unit 120 has, for example, two sets of shutter arrays of shutter array $A_1$ for 240 dots/inch and a shutter array $A_2$ for 300 dots/inch aligned individually along the longitudinal direction.

Figure 8:
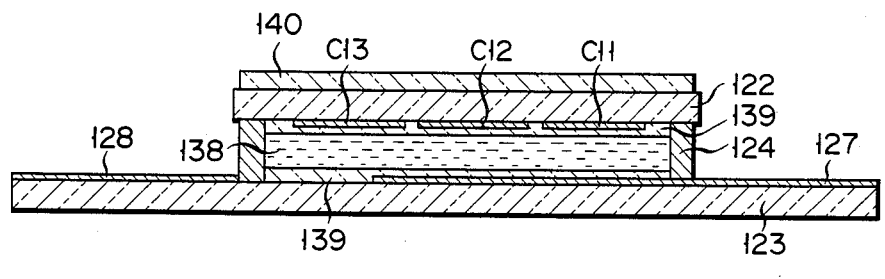
FIG. 8 is a sectional view taken along the line VIII—VIII of the liquid crystal unit in FIG. 6.
Figure 6:
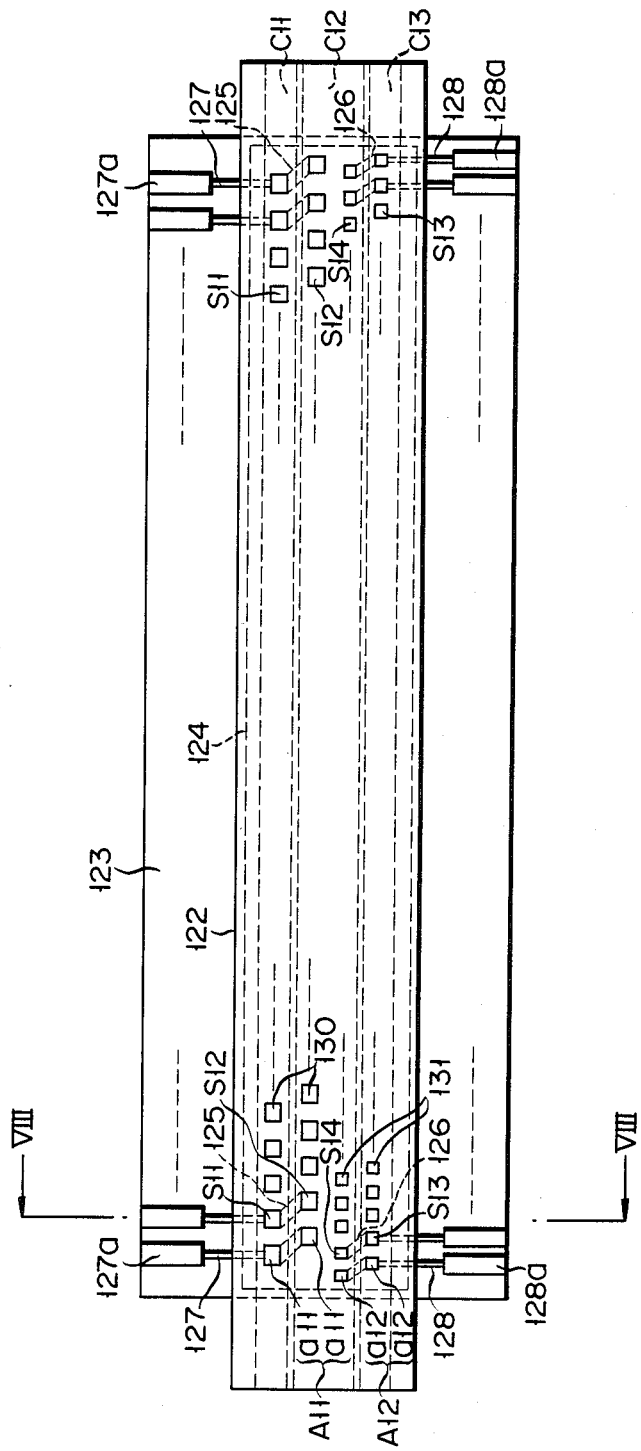
FIG. 6 is a plan view showing the construction of the liquid crystal unit shown in FIG. 5.
Figure 7:
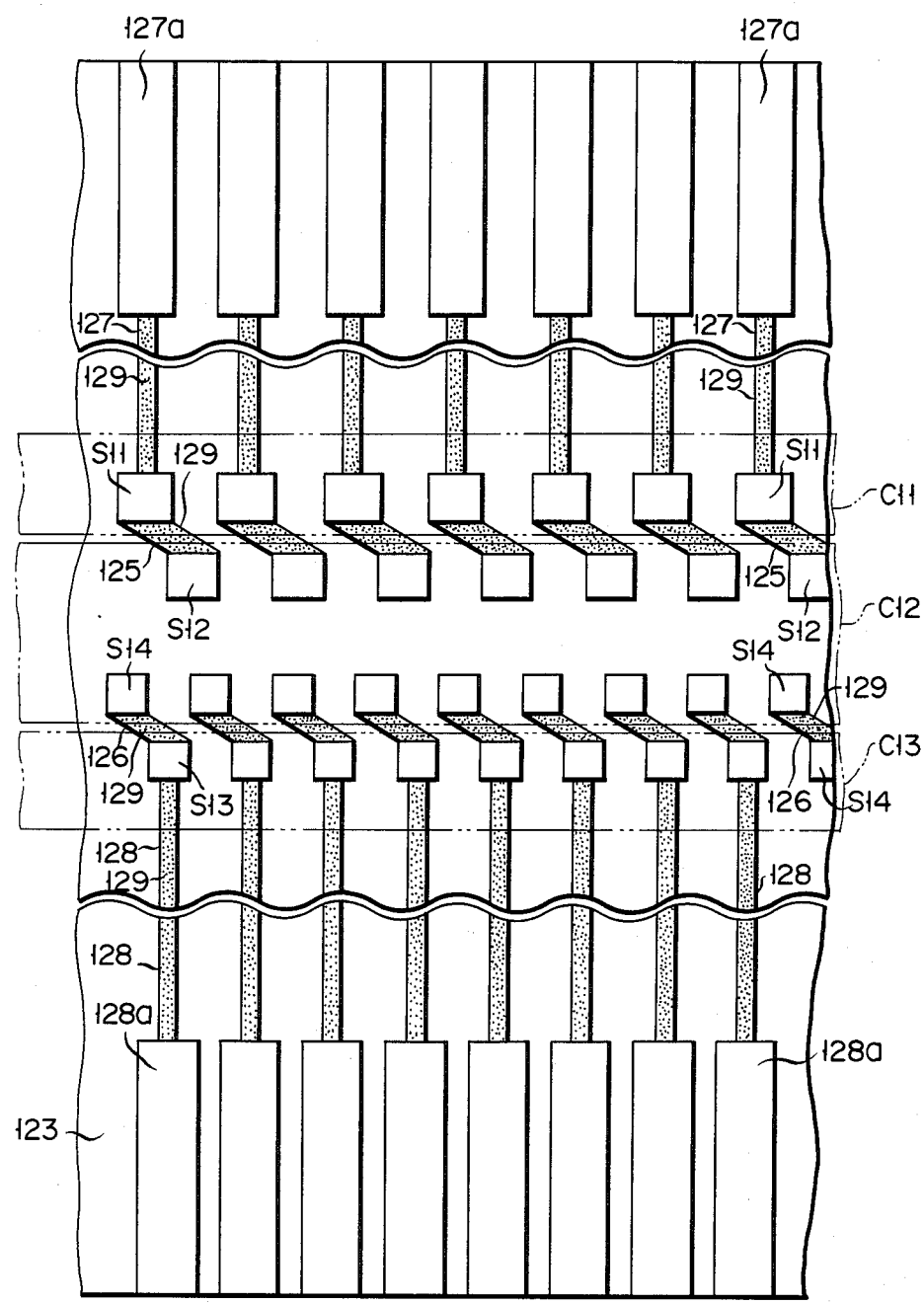
FIG. 7 is an enlarged plan view showing the electrode array of the liquid crystal unit in FIG. 6.

The construction of liquid crystal unit 120 will be described with reference to FIGS. 6, 7 and 8. In FIGS. 6, 7, 8, numerals 122 and 123 designate a pair of upper and lower substrates and both of substrates made of transparent glass plates. Substrates 122, 123 are bonded by a sealing material 124 of lateral long frame shape. Liquid crystal 38 for guest-host effect type is, for example, filled in a space between substrates 122 and 123 surrounded by material 124.

Three common electrodes $C_{11}$, $C_{12}$, $C_{13}$ of strip shape are formed in parallel at a miniature interval over the entire length on the inner surface of substrate 122. A number of segment electrodes $S_{11}$, $S_{11}$, ..., $S_{12}$, $S_{12}$, ..., $S_{13}$, $S_{13}$ of square shape are opposed in two rows to common electrodes $C_{11}$, $C_{12}$, $C_{13}$ of substrate 122 in a predetermined density over the longitudinal direction on the inner surface of substrate 123.

Electrodes $C_{11}$, $C_{12}$, $C_{13}$ and $S_{11}$, $S_{11}$, ..., $S_{12}$, $S_{12}$, ..., $S_{13}$, $S_{13}$ are formed of transparent electrode materials. Microshutters $a_{ll}$, $a_{ll}$, ... are arranged. Microshutters $a_{ll}$, $a_{ll}$ are arranged in two rows in the longitudinal direction of the substrates to form shutter array $A_{11}$ for 240 dots per inch. In other words, microshutters $a_{11}$, $a_{11}$, ... (segment electrodes $S_{11}$, $S_{11}$, ..., $S_{12}$, $S_{12}$, ...) are arranged in the density of 240 dots per inch. Microshutters $a_{12}$, $a_{12}$ of the size smaller than that of microshutters $a_{11}$, $a_{11}$, ... are formed in the portion that electrodes $C_{12}$, $C_{13}$ and segment electrodes $S_{13}$, $S_{13}$, ..., $S_{14}$, $S_{14}$, ... are opposed. Microshutters $a_{12}$, $a_{12}$, ... are aligned in two rows along the longitudinal direction of the substrate to form shutter array $A_{12}$ for 300 dots-/inch. In other words, microshutters $a_{12}$, $a_{12}$, ... (segment electrodes $S_{13}$, $S_{13}$, ..., $S_{14}$, $S_{14}$, ...) are arranged in the density of 300 dots per inch. Thus, two sets of shutter arrays $A_{11}$, $A_{12}$ are aligned in parallel.

Electrodes $S_{11}$, $S_{11}$, ..., and $S_{12}$, $S_{12}$, ... are arranged by displacing longitudinally of the Substrate in one array $A_{11}$. Electrodes $S_{13}$, $S_{13}$, ..., and $S_{14}$, $S_{14}$, ... are arranged by displacing longitudinally of the substrates in the other shutter array $A_{12}$. Therefore, microshutters $a_{11}$, $a_{11}$, ..., $a_{12}$, $a_{12}$, ... are arranged by displacing longitudinally of the substrates. When the microshutters are thus displaced, for example, in case of shutter array $A_{11}$, the regions between the rows of emitting points of the light passing microshutters $a_{11}$, $a_{11}$, ... of one row at every other row on the surface of the drum thus emitted are emitted by the light passing microshutters $a_{11}$, $a_{11}$, ... of the other row. Thus, an electrostatic latent image having high dot density is formed on the surface of the drum.

Electrodes $S_{11}$, $S_{11}$, ... of one row and electrodes $S_{12}$, $S_{12}$, ... of the other row in one shutter array $A_{11}$ are connected by common connecting leads 125, 125, ... formed on the inner surface of substrate 123 between adjacent ones by one pitch displacement. Electrodes $S_{13}$, $S_{13}$, ... of one row and electrodes $S_{14}$, $S_{14}$, ... of the other row in the other shutter array $A_{12}$ are connected by common connecting leads 126, 126, ... formed on the inner surface of substrate 123 between adjacent ones by one pitch displacement. Further, external connecting leads 127, 127, ... are respectively connected to electrodes $S_{12}$, $S_{12}$, ... of one row in shutter array $A_{11}$. External connecting leads 128, 128, ... are respectively connected to electrodes $S_{13}$, $S_{13}$, ... of the other row in shutter array $A_{12}$. External connecting leads 127, 127, ... are aligned longitudinally of the substrates at one side edge of substrate 123. Leads 128, 128, ... are aligned longitudinally of the substrates at the other side edge of substrate 123. Wide terminals 127a, 127a, ..., 128a, 128a, ... are respectively formed at the ends of leads 127, 127, ... and 128, 128, ... Leads 125, 125, ..., and 126, 126, ... and leads 127, 127, ..., and 128, 128, ... are formed of transparent electrode materials. Electrodes $C_{11}$, $C_{12}$ are respectively connected at the ends to external connecting leads.

As shown in FIG. 7, low resistance metal films 129, 129, ... for reducing electric resistance are coated on the surfaces of leads 125, 125, ..., and 126, 126, ... and leads 127, 127, ..., and 128, 128, ... except terminals 127a, 127a, ..., and 128a, 128a. Low resistance metal films (though not shown) are coated on the surfaces of electrodes $C_{11}$, $C_{12}$ except the portions of microshutters $a_{11}$, $a_{11}$, ..., and $a_{12}$, $a_{12}$, ... to be provided to reduce the electric resistance of the common electrodes $C_{11}$, $C_{12}$, $C_{13}$ and leads 127, 127, ..., 128, 128, ... and to restrict the light passing regions of shutters $a_{11}$, $a_{11}$, ..., $a_{12}$, $a_{12}$, ... In FIG. 7, numerals 130, 130, ..., 131, 131, ... designate shutter windows (the portions that transparent common electrodes $C_{11}$, $C_{12}$, $C_{13}$) restricted by the metal film for transmitting the light.

As shown in FIG. 8 liquid crystal aligning films 139 are respectively formed on the inner surfaces of substrates 122 and 123. Polarizing plates 140 are formed on the outer surface of substrate 122.

The liquid crystal unit 120 is constructed as described above. In unit 120, common electrode $C_{12}$ is formed commonly for electrodes $S_{12}$, $S_{12}$, ... of shutter array $A_{11}$ and electrodes $S_{13}$, $S_{13}$, ... of shutter array $A_{12}$. Therefore, only three sets of electrodes $C_{11}$, $C_{12}$, $C_{13}$ may be provided instead of four sets of common electrodes corresponding to segments $S_{11}$, $S_{11}$, ..., $S_{12}$, $S_{12}$, ..., $S_{13}$, $S_{13}$, ..., and $S_{14}$, $S_{14}$, ... Thus, the number of the common electrodes can be reduced.

Liquid crystal unit 120 thus constructed as described above have connecting conductors 132 of flexibility connected, as shown in FIG. 5, to the ends of common electrodes $C_{11}$, $C_{12}$, $C_{13}$ and terminals 127a, 127a, ..., 128a, 128a, ... of leads 127, 127, ..., 128, 128, .... The conductors 132 are connected to liquid crystal drive circuit 133 for applying a drive signal to unit 120. In array $A_{11}$, a voltage is applied by a drive signal from circuit 133 through the ends of electrodes Chd 11, $C_{12}$, leads 127, 127, ... and leads 125, 125, ... to electrodes $C_{11}$, $C_{12}$, $S_{11}$, $S_{11}$, ..., and $S_{12}$, $S_{12}$, .... Thus, the liquid crystals is operated to selectively drive microshutters $a_{11}$, $a_{12}$, ... to "open" or "close". Array $A_{12}$ applies a voltage of a drive signal of drive circuit 133 through the ends of electrodes $C_{12}$, $C_{13}$, leads 128, 128, ..., and 126, 126, ... to electrodes $C_{12}$, $C_{12}$, ..., $S_{13}$, $S_{13}$, ..., and $S_{14}$, $S_{14}$, .... Thus, shutters $a_{12}$, $a_{12}$, ... are selectively driven to "open" or "close". The drive type of unit 120 is of time division drive with two frequencies.

Drive circuit 133 is contained in controller 4.

Then, a shutter position setter 121 will be described in detail. In FIG. 5, a shutter holder 134 which holds liquid crystal unit 120 holds common substrate 122 to oppose to light source 16. Holder 134 is provided to linearly move along lateral direction of unit 120 (shutter array and direction). Numeral 135 designates a drive mechanism for moving holder 134 such as a solenoid, for example, of push-pull operation type. Rod 136 reciprocated by solenoid 135 is coupled with holder 134. Numeral 137 designates a solenoid drive circuit for applying a drive signal to solenoid 135. Solenoid 135 is driven by the drive signal from drive circuit 137. Rod 136 is moved in a direction of an arrow in FIG. 5 by solenoid 135 to linearly move integrally holder 134 to move unit 120 laterally (shutter array and direction). Thus, shutter arrays $A_{11}$, $A_{12}$ of unit 120 are selectively moved to position opposed to light source 116. In other words, unit 120 is moved in a direction of a solid line with an arrow in FIG. 5 at a distance corresponding the shutter array pitch to dispose one shutter array $A_{11}$ in an optical path from light source 116 to drum 101. Unit 120 is moved in a direction of a broken line with an arrow in FIG. 5 at a distance corresponding to the shutter array pitch to dispose other shutter array $A_{12}$ in an optical path from light source 116 to drum 101.

Drive circuit 137 is contained in controller 4.

Figure 13:
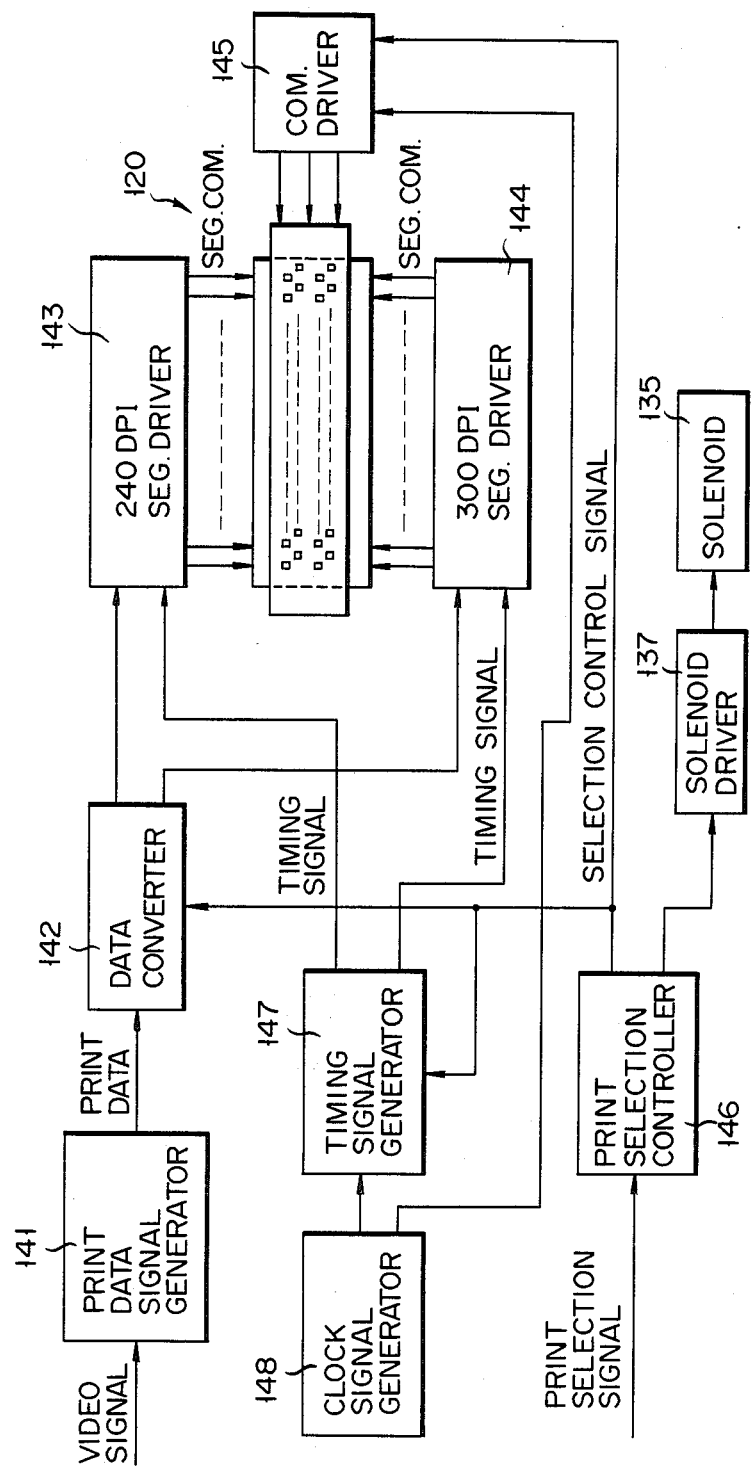
FIG. 13 is a block diagram of a drive circuit of the case that the liquid crystal unit in FIG. 6 is used.
Figure 14:
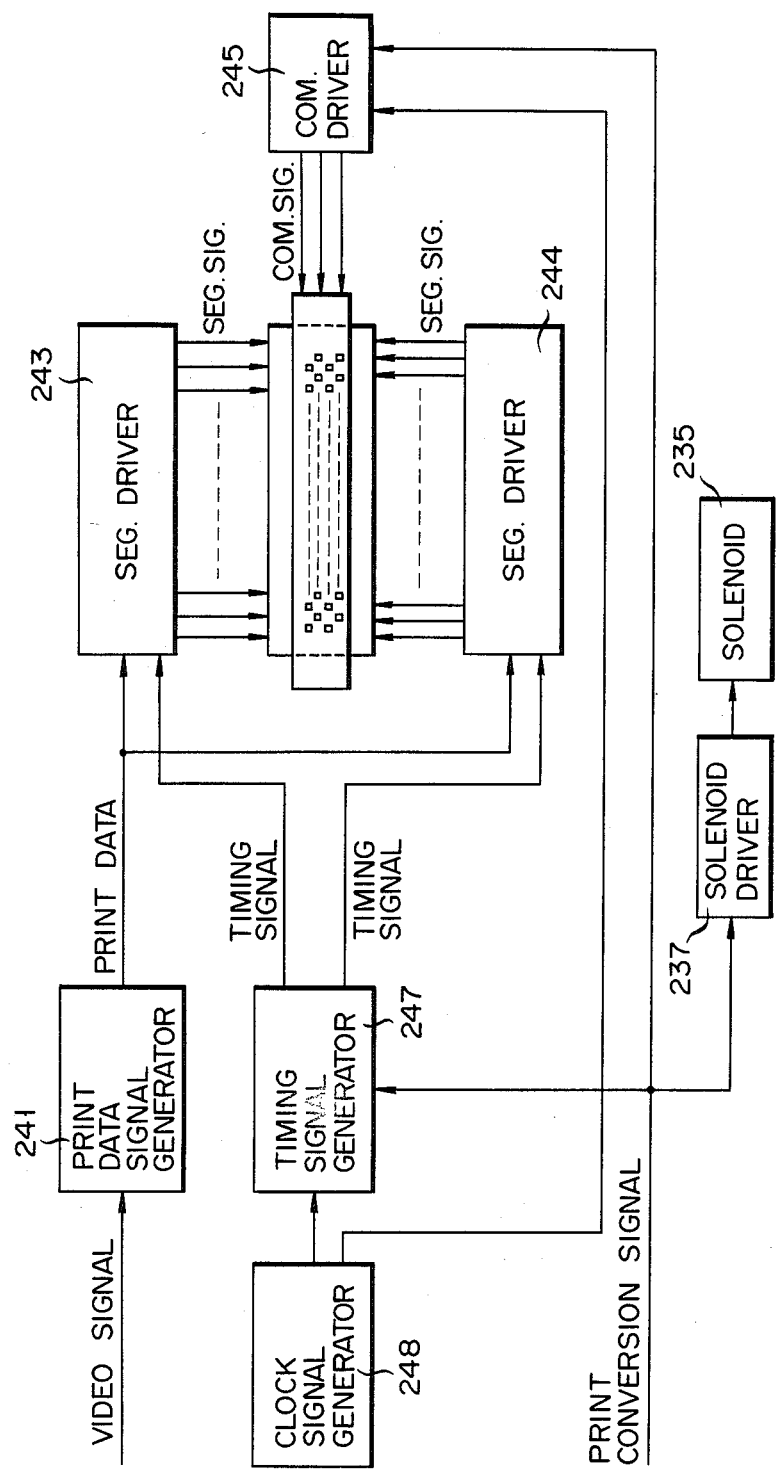
FIG. 14 is a block diagram of a drive circuit of the case that the liquid crystal unit in FIG. 9 is used.

Record controller 4 used in this embodiment will be described with reference to FIG. 13. Controller 4 receives a video signal of an image to be printed to select shutter array $A_{11}$ or $A_{12}$ of liquid crystal unit 120. Controller 4 controls to open or close selected microshutters $a_{11}$, $a_{11}$ or $a_{12}$, $a_{12}$ in accordance with printing data. In FIG. 13, print data signal generator 141 inputs a video signal corresponding to the image to be printed. Generator 141 outputs the inputted video signal as print data of serial output to data converter 142. Converter 142 selectively supplies data to first segment driver 143 or second segment driver 144. Driver 143 outputs a segment signal for controlling to open or close microshutters $a_{11}$, $a_{11}$ of shutter array $A_{11}$ arranged in the density of 240 dots/inch (240 DPI). The segment signal is applied through connecting lead 127 to segment electrodes $S_{11}$, $S_{12}$. Driver 144 outputs a segment signal for controlling to open or close microshutters $a_{12}$, $a_{12}$, ... of shutter array $A_{12}$ arranged in the density of 300 dots/inch (300 DPI). The segment signal is applied through leads 128 to electrodes $S_{13}$, $S_{14}$. Common driver 145 receives a clock signal from clock signal generator 148 to generate three common signals to common electrodes $C_{11}$, $C_{12}$, $C_{13}$ of unit 120 A print selection controller 146 receives a print selection signal to generate a selection control signal for controlling the operation of units. The selection control signal is applied to converter 142, common driver 145 and timing signal generator 147. Converter 142 which receives the selection control signal selectively outputs print data to drivers 143 and 144 in response to the signal. Driver 145 which receives the selection control signal selectively generates common signals for shutter array $A_{11}$ and $A_{12}$ in response to signal to common electrodes $C_{11}$, $C_{12}$ or $C_{12}$, $C_{13}$ Generator 147 receives a clock signal from a clock signal generator 148, and selectively outputs timing signals for 240 and 300 DPI in response to the selection control signal. The timing signal for 240 DPI is inputted to driver 143. The timing signal for 300 DPI is inputted to driver 144.

Controller 146 applies a drive control signal further to driver 137. Driver 137 drives solenoid 135 to move holder 134.

Controller 4 of the construction described above will operate as below. The case that an image is printed at 240 DPI will be described. When 240 DPI is selected, controller 146 outputs the selection control signal for selecting 240 DPI. Converter 142 receives the selection control signal, and supplies the inputted print data to 240 DPI driver. Simultaneously, the timing generator which receives the selection control signal supplies the timing signal to driver 143. Driver 143 reads out the print data supplied by the timing signal and applies a signal for controlling to open or close microshutters $a_{11}$, $a_{12}$ of shutter array $A_{11}$ in response to the data to electrodes $S_{11}$, $S_{12}$. Driver 145 receives a selection control signal, and supplies a common signal to electrodes $C_{11}$, $C_{12}$. Driver 137 receives the selection control signal from controller 146, and moves solenoid 135 to dispose shutter array $A_{11}$ in an optical path from light source 116 to drum 101.

Thus, a voltage is applied between electrodes $S_{11}$, $S_{12}$ of microshutters $a_{11}$, $a_{12}$ and electrodes $C_{11}$, $C_{12}$. The liquid crystal is operated by the voltage to control to open or close the shutters.

When the image is printed at 300 DPI, driver 144 is merely operated in the same manner as the operation described above.

The operation of recorder 3 in the second embodiment as described above will be described. In recorder 3, shutter arrays $A_{11}$, $A_{12}$ of unit 120 is selected by setter 121 based on image information to move liquid crystal unit 120 to the position corresponding to light source 116 according to image information. The microshutters of shutter arrays $A_{11}$, $A_{12}$ disposed corresponding to light source 116 are driven by drive circuit 133. An image of predetermined dot density is formed on drum 101 by controlling the passage of the light from light source 116. Solenoid 135 is driven by the drive signal from drive circuit 137 based on image information. Liquid crystal unit 120 is moved in a direction of a solid line with arrow through rod 136 and holder 134 by the operation of solenoid 135. One shutter array $A_{11}$ is disposed in response to light source 116. Microshutters $a_{11}$, $a_{11}$, ... of shutter array $A_{11}$ are driven to "open" or "close" by the drive signal based on image information from drive circuit 133. Thus, the light from light source 116 is controlled to pass by shutters $a_{11}$, $a_{11}$, ... of shutter arrays $A_{11}$. Further, the light is emitted through lens 117 onto the surface of drum 11. Thus, an electrostatic latent image and hence the image made of dots are formed. The dot density of the image at this time is based on the arraying density of microshutters $a_{11}$, $a_{12}$, ... of shutter array $A_{11}$. Since the arraying density of microshutters $a_{11}$, $a_{11}$, ... is 240 dots/inch, the dot density of the image becomes 240 dots/inch or 1/integer number, i.e., 120, 80, 60, 48, ... dots/inch. Solenoid 136 is driven by the drive signal from drive circuit 137 to move unit 120 in a direction of a broken line with an arrow. The other array $A_{12}$ is disposed corresponding to light source 116 by the movement of unit 120. Microshutters $a_{12}$, $a_{12}$, ... of array $A_{12}$ are driven to "open" or "close" by the drive signal from drive circuit 133. Thus, the light from light source 116 is controlled to pass microshutters $a_{12}$, $a_{12}$, ... of array $A_{12}$. An electrostatic latent image and hence image made of dots is formed on the surface of drum 1 by the light. The dot density of the image is based on the arraying density of microshutters $a_{12}$, $a_{12}$, ... of array $A_{12}$. Since the arraying density of microshutters $a_{12}$, $a_{12}$, ... is 300 dots/inch, the dot density of the image is 300 dots/inch. The image of 300 dots/inch or 1/integer number and hence 150, 100, 75, 50, ... dots/inch can be formed by simultaneously driving a plurality of microshutters. Thus, when two sets of arrays $A_{11}$, $A_{12}$ of unit 120 are used, the image of dot density of wide range combined with 240 and 300 dots/inch may be entirely formed. In other words, the image of 300, 240, 150, 120, 100, 80, 75, 60, 50, 48, ... dots/inch may be formed to print.

In the embodiment described above, a plurality of shutter arrays of different arraying densities of the microshutters are aligned in a sole liquid crystal unit. The number of liquid crystal units may be reduced. The structure of the holder can be simplified. Since the interval of shutter arrays can be reduced, the moving distance of the liquid crystal units can be shortened to simplify the structure of shutter position setting means.

In the embodiment described above, a plurality of shutter arrays are provided in a single liquid crystal unit. Since common electrodes for forming the shutter arrays are commonly used for two shutter arrays, the number of the electrodes can be decreased. Thus, the connection with the drive circuit can be facilitated.

Figure 10:
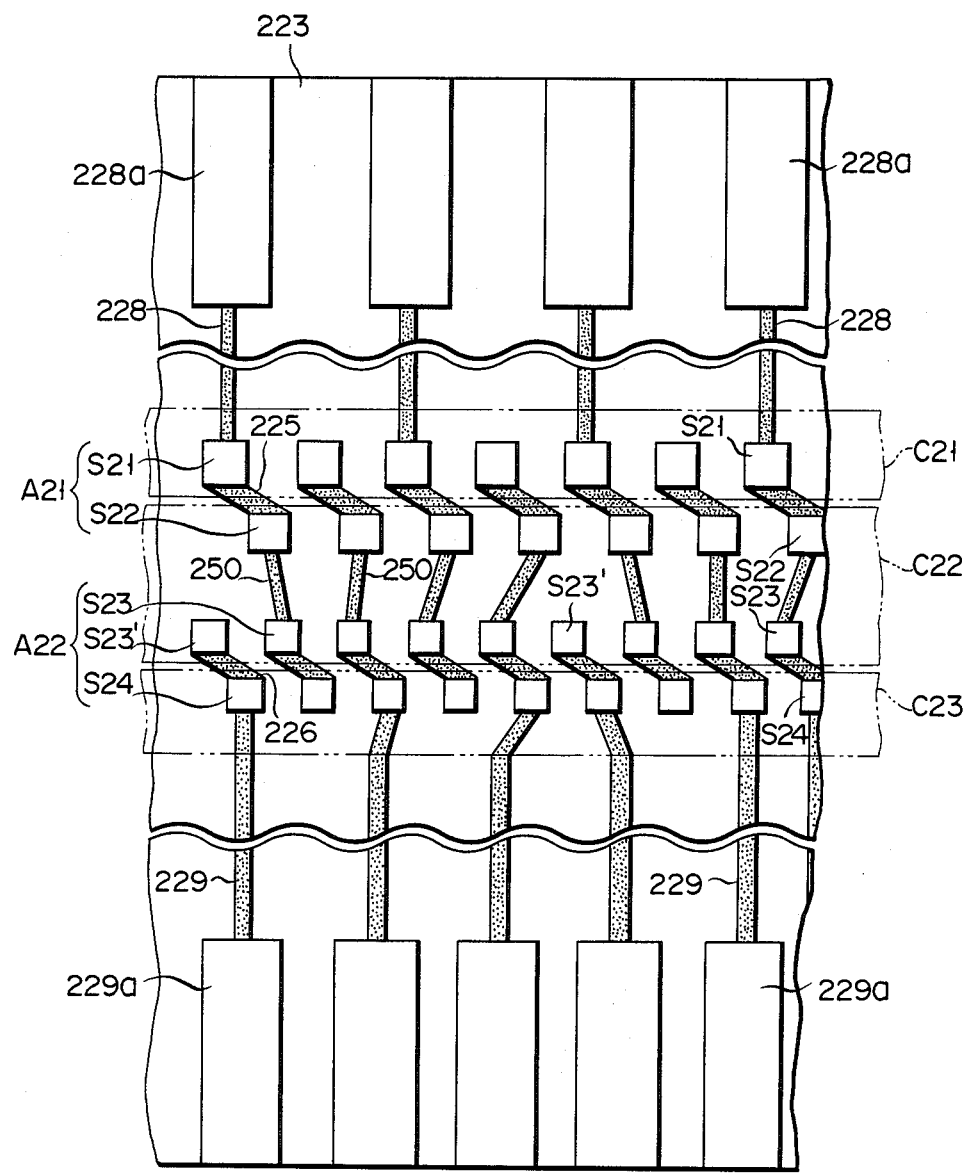
FIG. 10 is an enlarged plan view showing the electrode array of the liquid crystal unit shown in FIG. 9.

Modified example of the above-mentioned embodiment will be described with reference to FIGS. 9 and 10. In FIG. 9, the same reference numerals as those in FIGS. 6 and 7 designate the same or equivalent parts, and the description will be omitted.

In this example, segment electrodes $S_{22}$, $S_{22}$, ... of other row in shutter array $A_{21}$, and segment electrodes $S_{23}$, $S_{23}$, ... of other row in shutter array $A_{22}$ are connected by common connecting leads 250, 250, ... formed on the inner surface of segment substrate 223 between opposed electrodes. Thus, segment electrodes $S_{21}$, $S_{21}$, ... of one row in shutter array $A_{21}$, and segment electrodes $S_{22}$, $S_{22}$, ..., and segment electrodes $S_{23}$, $S_{23}$, ... of other row in shutter array $A_{22}$, and segment electrodes $S_{24}$, $S_{24}$, ... are connected by common connecting leads 225, 225, ..., 226, 226, ... and common connecting leads 250, 250, ... between opposed electrodes to form conductive lines. Thus, a plurality sets of conductive lines having a set of commonly connected segment electrodes $S_{21}$, $S_{22}$, $S_{23}$, $S_{24}$ and common connecting leads 226, 226 are formed to be aligned longitudinally of the substrates. Since the electrode arraying density (240 dots/inch) of one array $A_{21}$ and the electrode arraying density (300 dots/inch) of the other array $A_{22}$ are different and electrodes $S_{23}$, $S_{24}$ of array $A_{22}$ are more than electrodes $S_{21}$, $S_{22}$ of array $A_{21}$, might arise no connection of common connecting leads 250 between the shutter arrays. Then, as shown in FIG. 10, segment electrodes $S_{23}'$ disposed at every four of rows of electrodes $S_{23}$, $S_{23}$ are not connected to leads 250. Electrodes $S_{23}'$ not connected to leads 250 are uniformly dispersed in array $A_{22}$. Electrodes $S_{24}$ connected through electrodes $S_{23}'$ and leads 226 to electrode $S_{23}'$ are independent without forming the conductive lines. External connecting leads 228, 228, ... are respectively connected at every one to one electrodes $S_{21}$, $S_{21}$, ... in array $A_{21}$. In other words, leads 228, 228, ... are connected at every one of conductive lines. Leads 228, 228, ... are formed by aligning longitudinally of one side of segment substrate 223, and the ends are used as wide terminals 228a, 228a, ... for connecting the external conductors. External connecting leads 229, 229, ... are connected to one electrodes $S_{24}$, $S_{24}$, ... of array $A_{22}$ disposed at the conductor lines except the conductive lines connected to leads 228 and electrodes $S_{24}'$. Leads 229, 229, ... are formed by aligning longitudinally at the other side of substrate 223, and the ends are used as wide terminals 229a, 229a, ... Thus, leads 228, 228, ..., 229, 229, ... connected alternatively to the conductive lines are arranged on both sides of substrate 223.

Liquid crystal unit 220 commonly connects electrodes $S_{21}$, $S_{21}$, ..., $S_{22}$, $S_{22}$, ..., $S_{23}$, $S_{23}$, ..., $S_{24}$, $S_{24}$, ... of arrays $A_{21}$, $A_{22}$ by commonly connecting leads 225, 225, ..., 226, 226, ..., 250, 250, ... between opposed electrodes to form a plurality of sets of conductive lines, which are connected to external connecting leads 228, 228, ..., 229, 229, ... Thus, the numbers of leads 228, 228, ..., 229, 229, ... become ½ of the shutter arraying density (300 dot pitch) of array $A_{22}$ having large microshutter arraying density. On the other hand, as shown in FIGS. 6 and 7, in the arrangement that electrodes $S_{11}$, $S_{11}$, ..., $S_{12}$, $S_{12}$, ... are connected by leads 125, 125, ... in array $A_{11}$, electrodes $S_{13}$, $S_{13}$, ..., $S_{14}$, $S_{14}$ ... are connected by leads 126, 126, ... in array $A_{12}$ but electrodes $S_{12}$, $S_{12}$, ..., and $S_{14}$, $S_{14}$, ... are not connected by commonly connecting leads, the external connecting leads are connected at every electrodes $S_{11}$, $S_{11}$, ..., $S_{13}$, $S_{13}$, ... of arrays $A_{11}$, $A_{12}$. Accordingly, the number of the external connecting leads becomes sum of ½ of the arraying number of the microshutters of array $A_{11}$ and ½ of the arraying number of microshutters of array $A_{12}$. Thus, the number of the external connecting leads can be reduced in unit 220. Therefore, since the number of the electric connections reduces between unit 220 and liquid crystal drive circuits 234, the connection is facilitated. Since the number of output terminals of integrated circuits for forming drive circuits 234 reduces, the circuit configuration of drive circuits 234 is simplified. Since unit 220 form leads 228, 228, ..., 229, 229, ... sorted to both sides of substrate 223, a marginal space may be formed. Thus, since terminals 228a, 228a, ..., 229a, 229a, ... can be readily formed in a wide area, the contacting area between the terminals 228a, 228a, ..., 229a, 229a, ... and connecting conductors can be increased.

Record controller 4 used in the embodiment described above will be described with reference to FIG. 14. A video signal of the image to be printed is applied to print data signal generator 241. Generator 241 converts the video signal into serial data to output the serial data to first segment driver 243 and second segment driver 244. Drivers 243, 244 have shift registers 24 of the number corresponding to terminal electrodes of shutter array connected thereto, receive timing signals outputted from timing signal generating means 247, and read out print data synchronously with the timing signal. Drivers 243, 244 respectively supply segment signals for controlling to open or close microshutters $a_{21}$, $a_{21}$ or $a_{22}$, $a_{22}$ to segment electrodes $S_{21}$, $S_{22}$ or $S_{23}$, $S_{24}$ in response to print data thus read out. The print selection signal are applied to generator 247, common drivers 245, and solenoid driver 237. Driver 245 receives a clock signal from clock signal generator 248, and selectively outputs the common signal to electrodes $C_{21}$, $C_{22}$ or $C_{22}$, $C_{23}$ corresponding to selected array $A_{21}$ or $A_{22}$. Generator 247 receives the clock signal from generator 248, and outputs a timing signal in response to the density of the print dot selected by the print selection signal. Driver 237 operates solenoid 235, and moves the selected shutter array to an optical path from the light source to drum 101.

The above-mentioned controller will operate as below. Generator 247 which receives the print selection signal supplies the timing signal for reading out the data corresponding to the segment electrode for controlling the microshutter of the selected shutter array to drivers 243, 244. Drivers 243, 244 read out print data by the timing data, and supply the segment signals to signal electrodes $S_{21}$, $S_{22}$ or $S_{23}$, $S_{24}$ according to the data. The left end of FIG. 9 is used as reference in the shift register corresponding to the signal electrodes of liquid crystal unit in FIG. 9. If array $A_{21}$ is selected, driver 243 reads out input print data at every other data. Driver 244 sequentially reads out input data not read out by driver 243 in 5-, 6-, 9-, 10-, 15-, 16-th bit, ... shift registers. If array $A_{22}$ is selected, driver 243 reads out inputted 3-, 4-, 7-, 8-, 13-, 14-th data. Driver 244 sequentially reads out inputted 1-st, 2-nd, 5-, 6-, 9-, 10-, 12-th data. The common driver supplies the common signal to common electrodes corresponding to array $A_{21}$ or $A_{22}$. Thus, the microshutters of array $A_{21}$, $A_{22}$ apply voltage to between electrodes $S_{21}$, $S_{22}$ or $S_{13}$, $S_{14}$ and electrodes $C_{21}$, $C_{22}$ or $C_{23}$, $C_{24}$. Therefore, microshutters $a_{21}$, $a_{21}$, ..., or $a_{22}$, $a_{22}$, ... are controlled to be opened or closed. At this time, the solenoid driver is operated by the print selection signal, and the selected shutter array is moved into an optical path from the light source to the drum.

Figure 11:
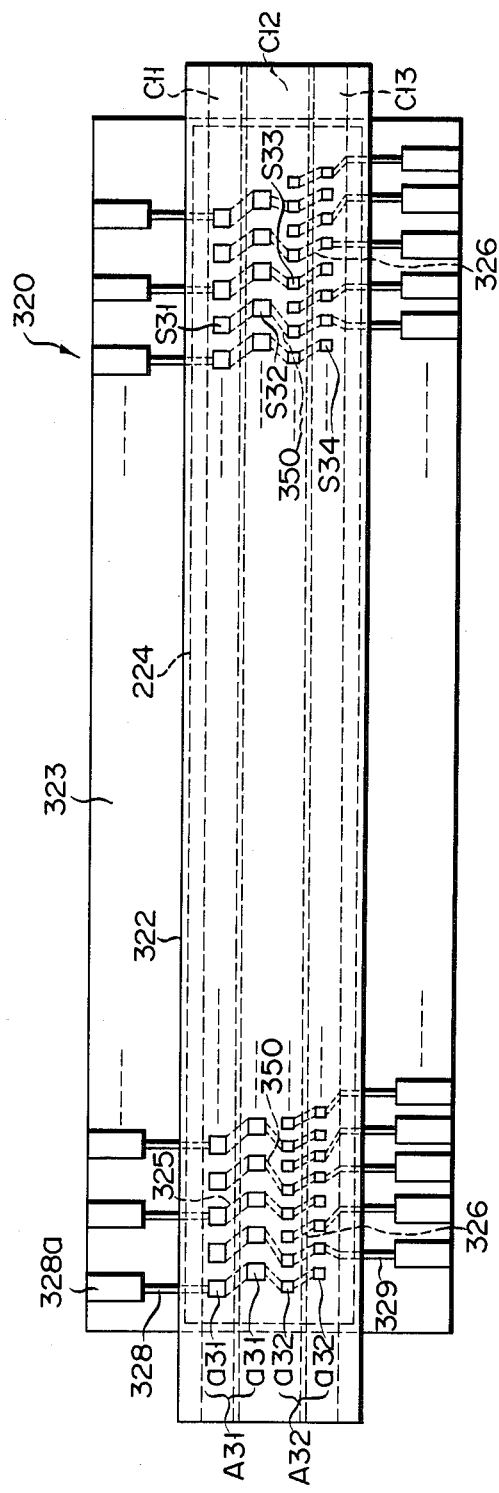
FIG. 11 is a plan view showing the construction of a further modified example of the liquid crystal unit in FIG. 5.
Figure 12:
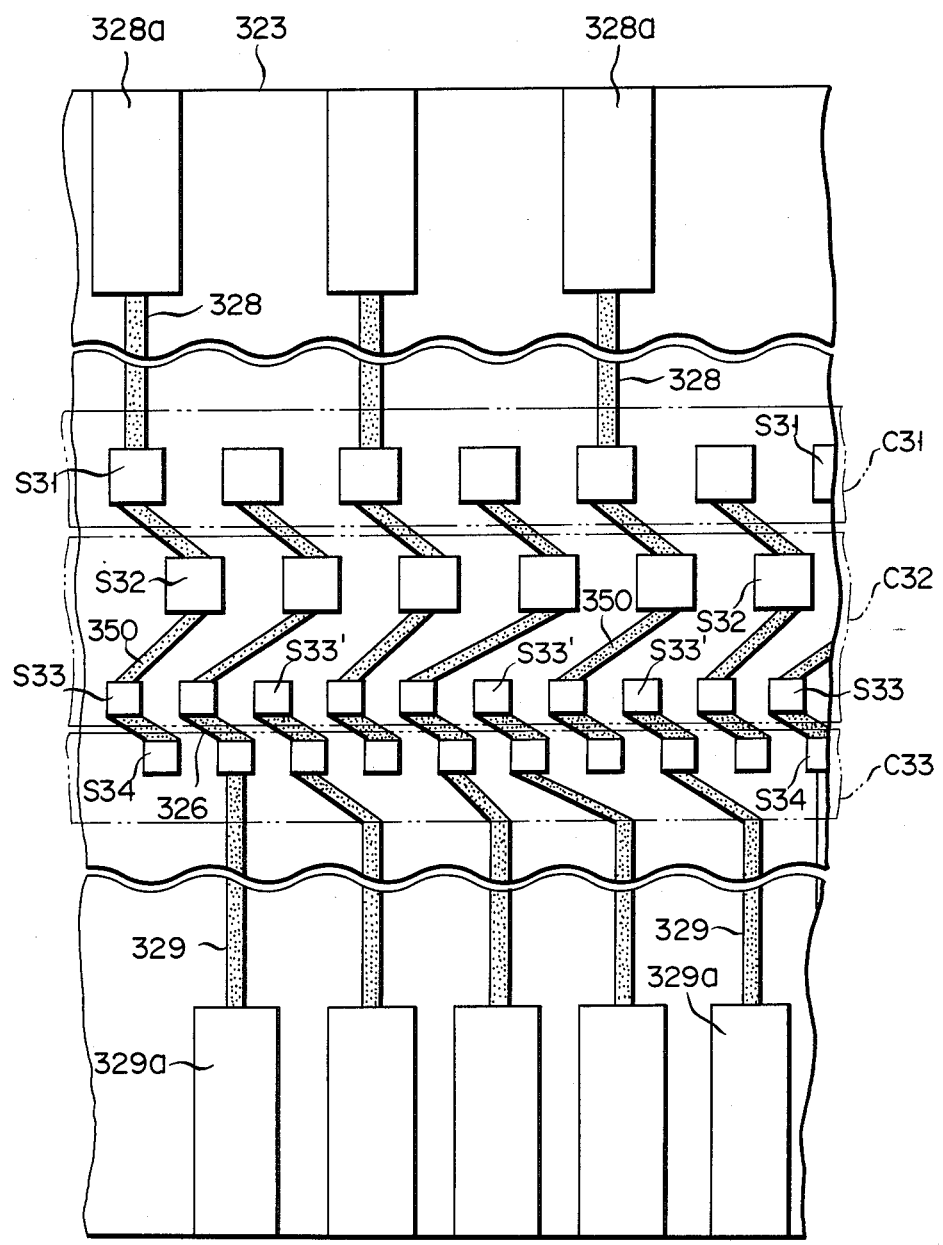
FIG. 12 is an enlarged plan view showing the electrode array of the liquid crystal unit in FIG. 11.

Further, other modified example of the embodiment will be described with reference to FIGS. 11 and 12. The example forms shutter array $A_{31}$ in which microshutters $a_{31}$, $a_{31}$, ... are arranged in the arraying density of 300 DPI and shutter array $A_{32}$ in which microshutters $a_{32}$, $a_{32}$ are arranged in the arraying density of 480 DPI in a sole liquid crystal unit 320. In FIGS. 11 and 12, the same parts denote the same or equivalent parts in FIGS. 9 and 10, and the description will be omitted.

Electrodes $S_{32}$, $S_{32}$, ... of other row in array $A_{31}$ and electrodes $S_{33}$, $S_{33}$, ... of other row in array $A_{32}$ are connected by common connecting leads 350, 350 formed on the inner surface of segment substrate 323 between opposed electrodes.

In this case, electrode arraying density (300 dots/inch) of one array $A_{31}$ and electrode arraying density (480 dots/inch) of other array $A_{32}$ are different, electrodes $S_{33}$ of array $A_{32}$ are more than electrodes $S_{32}$ of array $A_{31}$. Therefore, there might arise the case that common connecting leads 350 between shutter arrays are not connected. Thus, as shown in FIG. 12, three electrodes $S_{33}'$ of eight electrodes $S_{33}, S_{33}, \ldots$ are not connected to leads 350, and electrodes $S_{33}'$ not connected to leads 350 are uniformly dispersed in array $A_{32}$. Electrodes $S_{34}$ connected through electrodes $S_{33}'$ and leads 350 to electrode $S_{33}'$ are independent without forming the conductive line.

In the embodiment described above, the case that two sets of shutter arrays are provided in the liquid crystal shutter array has been described. However, the present invention is not limited to the particular embodiment. For example, the present invention may be applied to the liquid crystal unit having three or more sets of shutter arrays having different microshutter arraying density. In this case, the segment electrodes opposed to the shutter arrays are connected similarly to the unit 320 of the embodiment to form conductive lines, thereby reducing the external connecting leads for the segment electrodes to ½ of the microshutter arraying number of the shutter array having maximum arraying number of the microshutters.

The present invention is not limited to the configuration that the opposed segment electrodes in a plurality sets of shutter arrays provided in a liquid crystal unit are all commonly connected. More particularly, in liquid crystal unit 220 or 320 of the previous embodiments, electrodes $S_{21}, S_{21}, \ldots, S_{22} S_{22}, \ldots,$ or $S_{31}, S_{31}, \ldots, S_{32}, S_{32}, \ldots$ of arrays $A_{21}, A_{31},$ and other electrodes $S_{23}, S_{23}, \ldots,$ or $S_{33}, S_{33}, \ldots$ of array $A_{22}, A_{32}$ are commonly connected to form conductive lines, one electrodes $S_{24}, S_{24}, \ldots,$ or $S_{34}, S_{34}, \ldots$ of array $A_{24}$ or $A_{34}$ may be independently formed. Further, if three sets or more of shutter arrays are provided, the segment electrodes of at least two sets of arrays may be commonly connected between the opposed electrodes.

In summary, in the liquid crystal unit of the embodiment, a plurality of sets of shutter arrays of different microshutter arraying density are provided, and the segment electrodes of at least two sets of arrays may be commonly connected at every one.

Figure 15:
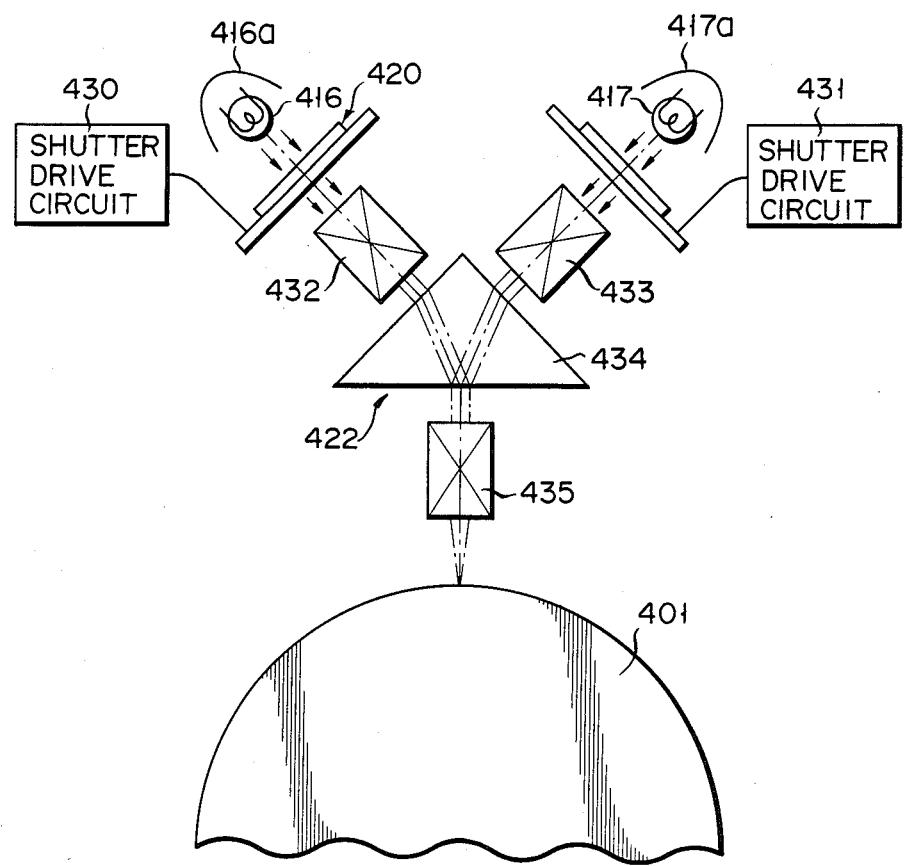
FIG. 15 is a schematic view of the construction of a light recorder according to third embodiment of the invention.

Further, a third embodiment of the present invention will be described in detail with reference to FIG. 15. Light recorder 3 shown in FIG. 1 is composed as below. Recorder 3 has two liquid crystal units 420, 421, light sources 416, 417 arranged corresponding to units 420, 421, and an optical unit 422 provided between units 420, 421 and photosensitive drum 401. The lights from light sources 416, 417 are controlled by units 420, 421 to emit to drum 410 through optical means 422. Sources 416, 417, units 420, 421 and optical unit 422 form a combination optical recording unit as a set. Numerals 416a, 417a designate reflecting plates respectively attached to sources 416, 417.

Units 420, 421 are constructed the same as liquid crystal units used in the first embodiment shown in FIGS. 3(a) and 3(b). Unit 420 has shutter arrays $A_1$ in which a plurality of microshutters $a_1, a_1$ are arranged. Unit 421 has shutter arrays $A_2$ in which a plurality of microshutters $a_2, a_2$ are arranged.

Units 420, 421 are respectively opposed to light sources 416, 417 to emit lights from light sources 416, 417. Thus, units 420, 421 control the passage of lights from light sources 416, 417 by opening or closing shutters $a_1, a_1, \ldots, a_2, a_2$ of shutter arrays $A_1, A_2$, respectively.

Then, optical unit 422 will be described. In FIG. 15, unit 422 has lenses 432, 433, which guide lights from light sources 416, 417 passing the microshutters of units 420, 421. Unit 422 also has prism 434, which has two incident surfaces for receiving lights from light sources 416, 417 guided by lenses 432, 433, and one emitting surface for emitting the lights incident from the two incident surfaces from light sources 416, 417 to guide to the same optical path. The number of the incident surfaces of prism 434 is specified to the number of the liquid crystal units. Unit 422 also has lens 435 for focusing the lights from light sources 416, 417 emitted from the emitting surface of prism 434 on the surface of drum 401.

The operation of recorder 3 of electrophotographic printer constructed as described above will be described.

When units 420, 421 of recorder 3 are driven, a signal from shutter drive circuit 430 is fed to unit 420 to drive microshutters $a_1, a_1, \ldots$ of array $A_1$ of unit 420 to "open" or "close". Thus, the light from light source 416 is controlled for the passage by microshutters $a_1, a_1, \ldots$ of array $A_1$ in unit 420. Then, the light which passes microshutters $a_1, a_1$ are emitted through lens 432, prism 434 and lens 435 of optical unit 422 to the surface of drum 401. Thus, an electrostatic latent image is formed on drum 401. The latent image is printed as an image on recording sheet 6 in the sequence described with respect to FIG. 1. The dot density of the image is determined according to the arraying density (240 dots/inch) of microshutters $a_1, a_1, \ldots$ of unit 420. In other words, the dot densities capable of printing by unit 420 are 240 dots/inch and 1/integer number of 240 dots/inch, i.e., 120, 80, 60, 48, . . . dots/inch. When unit 421 is driven, microshutters $a_2, a_2, \ldots$ of array $A_2$ of unit 421 are set by signal from drive circuit 431 to "open" or "close". Thus, the light from light source 417 is controlled to pass microshutters $a_2, a_2$ of array $A_2$, and further emitted through lens 433, prism 434 and lens 435 onto the surface of drum 401. Thus, an electrostatic latent image is formed on drum 401, and printed as an image on sheet 6 as shown in FIG. 1. The dot densities of the image are determined according to the arraying density (300 dots/inch) of microshutters $a_2, a_2, \ldots$ of unit 421. In other words, the dot density capable of printing by unit 421 include 300 dots/inch and 1/integer number of 300 dots/inch, i.e., 150, 100, 75, 50, . . . dots/inch.

When the image is formed in recorder 3, either one of units 420, 421 is turned OFF according to the image information, and the other is driven, the image is formed on drum 401 by the driven liquid crystal unit to be printed, thereby printing in selected dot density. Both units 420 and 421 are driven in ON state to simultaneously form the image on drum 401 to print the image. In this case, the images by unit 420 and 421 are formed on different portions of the surface of drum 401 so as not to superpose each other, thereby printing on different portions of sheet 6. For example 240 dots/inch of printing is performed on one side of sheet 6 by unit 420, and 300 dots/inch of printing is executed on the other side of sheet 6 by unit 421.

In the embodiment described above, units 420 and 421 are used in combination to print in dot density of wide range entirely combined with 240 dots/inch and 300 dots/inch. In other words, the image can be printed by 300, 240, 150, 120, 100, 80, 75, 60, 50, 48, . . . dots- /inch. The modes that units 420 and 421 are individually driven and simultaneously driven are suitably selected in combination to form the image having various sorts of dot densities on any of the same recording sheet to be printed.

In the embodiments described above, the case that two liquid crystal units are provided has been described. The present invention is not limited to the particular embodiment. Three or more liquid crystal units may be provided in recorder 3. In this case, prism 434 provided in optical unit 422 of recorder 3 has incident surfaces of the number matched to the number of liquid crystal units.

What is claimed is:

1. An image forming apparatus, comprising:
   at least one light source;
   photosensitive means having a surface onto which light from the light source is radiated so that charges on at least a part of the surface that has been charged uniformly in advance, are discharged by photosensing light from the light source;
   latent image-forming means having a plurality of light control means formed by a plurality of sets of microminiature regions of certain sizes wherein each microminiature region selectively controls the passage, interception and quantity of light emitted from the light source toward said photosensitive means, for forming a latent image on certain portions of said photosensitive means that have been illuminated by the light and other portions which have not been illuminated by the light, said microminiature regions of said light control means forming corresponding parts of said latent image, respectively, and the microminiature regions of one set each having a certain size which is different from the size of the microminiature regions of another set; and
   means for fixing the latent image formed on the photosensitive means as a visible image on a recording medium.

2. The image forming apparatus according to claim 1, wherein said means for forming a latent image comprises a first shutter array having a plurality of microshutters arranged to have regions of first size for controlling the passage of light from said light source, and a second shutter array having a plurality of microshutters arranged to have regions of second size larger than the first size.

3. The image forming apparatus according to claim 2, wherein said first and second shutter arrays are arranged in liquid crystal units respectively comprising a pair of opposed substrates, opposed electrodes respectively formed on the opposed inner surfaces of the pair of substrates, liquid crystals sealed between the pair of substrates, and at least one polarizing plate disposed outside the pair of substrates.

4. The image forming apparatus according to claim 3, wherein said first and second shutter arrays are liquid crystal microshutter arrays formed in different liquid crystal unit.

5. The image forming apparatus according to claim 3, wherein said first and second shutter arrays are a plurality of liquid crystal microshutter arrays formed in sole liquid crystal units.

6. The image forming apparatus according to claim 5, wherein said sole liquid crystal unit comprises a plurality of first signal electrodes and a second signal electrode having a size larger than the first signal electrodes and formed on one substrate, at least one common electrode opposed to the first and second signal electrodes formed on the other substrate, a plurality of liquid crystal microshutters formed in the region that the first or second signal electrode and a common electrode are opposed, and the passing state of the light passing said liquid crystal microshutter is controlled by applying a voltage to between said first or second signal electrode and said common electrode.

7. The image forming apparatus according to claim 5, wherein said liquid crystal unit comprises a plurality of liquid crystal microshutters which are arranged in rows and formed in a first region where first signal electrodes, second signal electrodes and first common electrode oppose, a second region where other first signal electrodes and second common electrodes oppose and a third region where other second signal electrodes and the second common electrodes oppose, said first signal electrodes and said second signal electrodes, which are larger than said first signal electrodes, being formed on one of said substrates, and said first common electrodes, said second common electrode, and third common electrode opposing said first and/or second signal electrodes being formed on the other substrate, and wherein the passage of the light through said liquid crystal microshutters is controlled by applying a voltage between said first electrode or said second signal electrode and said third common electrode.

8. The image forming apparatus according to claim 7, wherein said second and third common electrodes respectively have one electrode, a plurality of first liquid crystal microshutters having first size arranged in two rows on the portion that said first and second common electrodes are opposed to said first signal electrode, and a plurality of second liquid crystal microshutters having second size arranged in two rows on the portion that said first and third common electrodes are opposed to said second signal electrode so that the second size is larger than the first size.

9. The image forming apparatus according to claim 8, wherein said plurality of first liquid crystal microshutters are arranged in two rows in zigzag manner, and said plurality of second liquid crystal microshutters are also arranged in two rows in zigzag manner.

10. The image forming apparatus according to claim 6, wherein at least one of said first and second signal electrodes is electrically connected in one-to-one relation to said second signal electrode by a connecting electrode.

11. The image forming apparatus according to claim 1, wherein said means for forming a latent image comprises a first shutter array having a plurality of microshutters arranged to have regions of first size for controlling the passage of light from said light source, a second shutter array having a plurality of microshutters arranged to have regions of second size larger than the first size, light guiding means for guiding light from said light, source passing said first or second shutter array to the photosensitive means, and position setting means for selectively moving said first or second shutter array into an optical path from the light source to the photosensitive means.

12. The image forming apparatus according to claim 11, wherein said first and second shutter arrays are a plurality of liquid crystal microshutter arrays formed of sole liquid crystal units.

13. The image forming apparatus according to claim 12, wherein said first shutter arrays are a plurality of liquid crystal microshutter arrays for forming 240 of miniature dots per inch on the photosensitive means, and said second shutter arrays are a plurality of liquid crystal microshutter arrays for forming 300 of miniature dots per inch on the photosensitive means.

14. The image forming apparatus according to claim 12, wherein said first shutter arrays are a plurality of liquid crystal microshutter arrays for forming 300 of miniature dots per inch on the photosensitive means, and said second shutter arrays are a plurality of liquid crystal microshutter arrays for forming 480 of miniature dots per inch on the photosensitive means.

15. The image forming apparatus according to claim 2, wherein said means for forming a latent image further comprises optical means for guiding the light passing the first or second shutter array to substantially the same position of said photosensitive means.

16. The image forming apparatus according to claim 15, wherein said optical means is optical coincidence means for bringing the light passing the first shutter array substantially into coincidence with the optical path of the light passing the first shutter array.

17. The image forming apparatus according to claim 16, wherein said optical path coincidence means is a prism.

18. An image forming apparatus, comprising:
at least one light source;
photosensitive maens for discharging charge stored in advance on a surface thereof by photosensing light from the light source;
means including a plurality of light control means formed by a plurality of microminiature regions for controlling the quantity of light to form a latent image on said photosensitive means, including means for controlling the light emitted from the light source toward the photosensitive means, said microminiature regions having different sizes to form said latent image; and
means for fixing the latent image formed on the photosensitive means as a visible image on a recording medium;
wherein said latent image forming means comprises a first shutter array having a plurality of micro-shutters arranged to have regions of a first size for controlling the passage of light from said light source, and a second shutter array having a plurality of micro-shutters arranged to have regions of a second size larger than said first size;
said first and said second shutter arrays are arranged in liquid crystal units respectively comprising a pair of opposed substrates, opposed electrodes respectively formed on the opposed inner surfaces of the pair of substrates, liquid crystals sealed between the pair of substrates, and at least one polarizing plate disposed outside the pair of substrates;
said first and said second shutter arrays are a plurality of liquid crystal micro-shutter arrays formed in sole liquid crystal units; and
said sole liquid crystal unit comprises a plurality of first signal electrodes and a second signal electrode having a size larger than said first signal electrodes and formed on one substrate, at least one common electrode opposed to the first and the second signal electrodes and formed on the other substrate, a plurality of liquid crystal micro-shutters formed in a region in which the first or the second signal electrodes and a common electrode are opposed, and means for controlling a passing state of light passing throughs said liquid crystal micro-shutters in response to a voltage applied between said first or said second signal electrodes and said common electrode.

19. An image forming apparatus, comprising:
at least one light source;
photosensitive means for discharging charge stored in advance on a surface thereof by photosensing light from the light source;
means including a plurality of light control means formed by a plurality of microminiature regions for controlling the quantity of light to form a latent image on said photosensitive means, including means for controlling the light emitted from the light source toward the photosensitive means, said microminiature regions having different sizes to form said latent image; and
means for fixing the latent image formed on the photosensitive means as a visible image on a recording medium;
wherein said latent image forming means comprises a first shutter array having a plurality of micro-shutters arranged to have regions of a first size for controlling the passage of light from said light source, and a second shutter array having a plurality of micro-shutters arranged to have regions of a second size larger than said first size;
said first and said second shutter arrays are arranged in liquid crystal units respectively comprising a pair of opposed substrates, opposed electrodes respectively formed on the opposed inner surfaces of the pair of substrates, liquid crystals sealed between the pair of substrates, and at least one polarizing plate disposed outside the pair of substrates;
said first and said second shutter arrays are a plurality of liquid crystal micro-shutter arrays formed in sole liquid crystal units; and
said liquid crystal unit comprises a plurality of liquid crystal micro-shutters which are arranged in rows and formed in a first region where first signal electrodes, second signal electrodes and first common electrodes oppose, a second region where different ones of said first signal electrodes and second common electrodes oppose, and a third region where different ones of said second signal electrodes and said second commom electrodes oppose one another, both of said first and said second signal electrodes being larger than said first signal electrodes and formed on one of said substrates, and said first common electrodes, said second common electrodes and a third common electrode opposing at least one of said first and said second signal electrodes is formed on the other substrate, and including means for controlling the passage of light through said liquid crystal micro-shutters in response to a voltage applied between said first or said second signal electrodes and said third common electrode.

20. The image forming apparatus according to claim 19, wherein said second and said third common electrodes are each formed of one electrode, a plurality of first liquid crystal micro-shutters of a first size are arranged in two rows at a region where said first and said second electrodes are opposed to said first signal electrodes, and a plurality of second liquid crystal micro-shutters of a second size are arranged in two rows at a region where said first and said third common electrodes are opposed to said second signal electrodes, wherein said second size is larger than said first size.

21. The image forming apparatus according to claim 20, wherein said pluarlity of first liquid crystal micro-shutters are arranged in two rows in a zigzag manner, and said plurality of second liquid crystal micro-shutters are also arranged in two rows in a zigzag manner.

22. The image forming apparatus according to claim 18, wherein at least one of said first signal electrodes is electrically connected in one-to-one relation to a second signal electrode by a connecting electrode.

23. An image forming apparatus, comprising:
at least one light source;
photosensitive means for discharging charge stored in advance on a surface by photosensing light from the light source;
latent image-forming means having a plurality of light control means formed by a plurality of microminiature regions for controlling a quantity of light to form a latent image on said photosensitive means by controlling the light emitted from the light source toward the photosensitive means, said microminiature regions having different sizes to form said latent image; and
means for fixing the latent image formed on the photosensitive means as a visible image on a recording medium;
wherein said latent image-forming means comprises a first shutter array having a plurality of micro-shutters arranged with regions of a first size for controlling the passage of light from said light source, a second shutter array having a plurality of microshutters arranged with regions of a second size larger than said first size, light-guiding means for guiding light from said light source passing said first or said second shutter array to photosensitive unit means, and position setting means for selectively moving said first or said second shutter array into an optical path from the light source to the photosensitive unit means;
said first and said second shutter arrays are a plurality of liquid crystal microshutter arrays formed of sole liquid crystal units; and
said first shutter arrays are a plurality of liquid crystal microshutter arrays for forming 240 miniature dots per inch on the photosensitive unit means, and said second shutter arrays are a plurality of liquid crystal microshutter arrays for forming 300 miniature dots per inch on the photosensitive unit means.

24. An inage forming apparatus, comprising:
at least one light source;
photosensitive means for discharging charge stored in advance on a surface by photosensing light from the light source;
latent image-forming means having a plurality of light control means formed by a plurality of microminiature regions for controlling a quantity of light to form a latent image on said photosensitive means by controlling the light emitted from the light source toward the photosensitive means, said microminiature regions having different sizes to form said latent image; and
means for fixing the latent image formed on the photosensitive means as a visbible image on a recording medium;
wherein said latent image-forming means comprises a first shutter array having a plurality of micro-shutters arranged with regions of a first size for controlling the passage of light from said light source, a second shutter array having a plurality of microshutters arranged with regions of a second size larger than said first size, light-guiding means for guiding light from said light source passing said first or said second shutter array to photosensitive unit means, and position setting means for selectively moving said first or said second shutter array into an optical path from the light source to the photosensitive unit means;
said first and said second shutter arrays are a plurality of liquid crystal microshutter arrays formed of sole liquid crystal units; and
said first shutter arrays are a plurality of liquid crystal microshutter arrays for forming 300 miniature dots per inch on the photosensitive unit means, and said second shutter arrays are a plurality of liquid crystal microshutter arrays for forming 480 miniature dots per inch on the photosensitive unit means.

25. An image forming apparatus, comprising:
at least one light source;
photosensitive means for discharging charge stored in advance on a surface by photosensing light from the light source;
latent image-forming means having a plurality of light control means formed by a plurality of microminiature regions for controlling a quantity of light to form a latent image on said photosensitive means by controlling the light emitted from the light source toward the photosensitive means, said microminiature regions having different sizes to form said latent image; and
means for fixing the latent image formed on the photosensitive means as a visible image on a recording medium;
wherein said latent-image forming means comprises a first shutter array having a plurality of micro-shutters arranged with regions of a first size for controlling the passage of light from said light source, and a second shutter array having a plurality of microshutters arranged with regions of a second size larger than said first size;
said latent-image forming means includes optical means for guiding the light passing said first or said second shutter array to substantially the same position at said photosensitive unit means;
said optical means is optical path coincidence means for bringing the light passing the first shutter array substantially into coincidence with the optical path of the light passing the second shutter array; and
said optical path coincidence means is a prism.

* * * * *